United States Patent
Cai et al.

(10) Patent No.: US 12,206,541 B2
(45) Date of Patent: Jan. 21, 2025

(54) COMMUNICATION METHOD AND APPARATUS

(71) Applicant: Huawei Technologies Co., Ltd., Shenzhen (CN)

(72) Inventors: Shijie Cai, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/324,631

(22) Filed: May 26, 2023

(65) Prior Publication Data

US 2023/0300016 A1  Sep. 21, 2023

Related U.S. Application Data

(63) Continuation of application No. PCT/CN2020/132968, filed on Nov. 30, 2020.

(51) Int. Cl.
*H04L 27/26* (2006.01)

(52) U.S. Cl.
CPC .............................. *H04L 27/2626* (2013.01)

(58) Field of Classification Search
CPC .. H04B 1/713; H04B 7/06; H04B 7/08; H04L 1/00; H04L 5/00; H04L 25/02; H04L 27/26; H04L 27/2626; H04W 16/28; H04W 52/28; H04W 52/36; H04W 72/04; H04W 72/0453; H04W 74/08
USPC ................. 375/219, 260, 262, 267, 295, 316
See application file for complete search history.

(56) References Cited

U.S. PATENT DOCUMENTS

| | | | | |
|---|---|---|---|---|
| 2019/0013909 | A1* | 1/2019 | Li | H04L 5/0048 |
| 2019/0260535 | A1* | 8/2019 | Moroga | H04W 92/20 |
| 2023/0396387 | A1* | 12/2023 | Harrison | H04L 5/0094 |

\* cited by examiner

*Primary Examiner* — Shawkat M Ali
(74) *Attorney, Agent, or Firm* — Slater Matsil, LLP

(57) ABSTRACT

This application provides a communication method and an apparatus, so that a terminal device and a network device can determine, based on a frequency domain position of each resource element in a second resource element set, a transmit sequence of each uplink transmit port on the second resource element set, to send and receive an uplink reference signal on a non-uniform pilot resource.

20 Claims, 7 Drawing Sheets

COMMUNICATION METHOD AND APPARATUS

CROSS-REFERENCE TO RELATED APPLICATIONS

This application is a continuation of International Application No. PCT/CN202032968, filed on Nov. 30, 2020, the disclosure of which is hereby incorporated by reference in its entirety.

TECHNICAL FIELD

This application relates to the field of wireless communication technologies, and in particular, to a communication method and an apparatus.

BACKGROUND

In long term evolution (LTE) and new radio access technologies, a multiple input multiple output (MIMO) technology is widely used. For a cell-edge user, a cell-edge signal-to-noise ratio is increased in a space frequency block code (SFBC) transmission mode. For a cell-center user, a high data transmission rate is provided in a multi-layer parallel transmission mode. If a base station can obtain a part or all of downlink channel state information (CSI), a pre-coding technology may be used for improving signal transmission quality or increasing a signal transmission rate. For a time division multiplexing (TDD) system, uplink and downlink of a radio channel have reciprocity. The base station receives a sounding reference signal (SRS) sent by a terminal device, performs channel estimation to obtain uplink CSI, and further obtains downlink CSI based on the uplink-downlink reciprocity.

In a conventional technology, SRSs are arranged in an equi-spaced comb in frequency domain. Consequently, a quantity of available bases is limited, and a port multiplexing capability is reduced.

SUMMARY

Embodiments of this application provide a communication method and an apparatus, to improve a port multiplexing capability.

According to a first aspect, a communication method is provided. The method may be performed by a first communication apparatus. The first communication apparatus may be a communication device or a communication apparatus, for example, a chip, that can support the communication device in implementing a function required in the method. For example, the first communication apparatus is a terminal device, or a chip or another component that is disposed in the terminal device and that is configured to implement a function of the terminal device.

For example, a terminal device is used as an execution body. The method includes: The terminal device determines a second resource element set from a first resource element set. Frequency domain positions of all resource elements in the second resource element set are distributed at unequal intervals. The first resource element set includes a resource element that is on a first OFDM symbol and that belongs to a transmit bandwidth of a first signal, or the first resource element set includes a resource element that is on all OFDM symbols in a first OFDM symbol group and that belongs to the transmit bandwidth of the first signal. The first OFDM symbol group includes a plurality of OFDM symbols. The terminal device determines a first sequence of a first uplink port on each of the resource elements based on the frequency domain positions of all the resource elements in the second resource element set. The terminal device sends the first signal on each of the resource elements based on the first sequence.

According to the foregoing method, the terminal device may determine a transmit sequence of each uplink transmit port on the second resource element set based on a frequency domain position of each resource element in the second resource element set, to send and receive the first signal on a non-uniform pilot resource. In comparison with a solution of sending the first signal on a uniform pilot resource, this can improve a port multiplexing capability.

In a possible design, when the first resource element set includes the resource element that is on the first OFDM symbol and that belongs to the transmit bandwidth of the first signal, a first sequence $r^{(p)}(k)$ of the first uplink port on a $k^{th}$ resource element in the second resource element set satisfies:

$$r^{(p)}(k) = r^{(\alpha,I)}(k)$$

$$r^{(\alpha,I)}(k) = e^{wj\alpha \frac{I_k + \Delta}{C}} \bar{r}(k),$$

$\bar{r}(k)$ is a base sequence, I is a set of the frequency domain positions of all the resource elements in the second resource element set, $I_k$ indicates a frequency domain position of the $k^{th}$ resource element in the second resource element set, k=0, ..., or M−1, w=1 or w=−1, Δ is a constant, C is an integer greater than or equal to 1, p is the first uplink port, and α is a cyclic shift value. According to this design, when this formula is used for generating the first sequence for a plurality of ports, the second resource element set may be code division multiplexed for first signals of the plurality of ports, to improve a multiplexing capability.

In a possible design, when the first signal is an SRS, α satisfies:

$$\alpha = 2\pi \frac{n_{SRS}^{cs}}{n_{SRS}^{cs,max}},$$

and $n_{SRS}^{cs} \in \{0, 1, \ldots, n_{SRS}^{cs,max}-1\}$. According to this design, when the second resource element set is code division multiplexed for SRS signals of a plurality of ports, and cyclic shift values are separately generated by using this formula, interference between the SRS signals of the plurality of ports can be reduced.

In a possible design, the terminal device may further receive I and/or a parameter used for determining I, and/or receive α and/or $n_{SRS}^{cs}$. According to this design, a manner of receiving and processing an SRS signal by the terminal can be configured.

In a possible design, a first signal $\alpha_{I_k+n_{start}}^{(p)}$ corresponding to a resource element whose number is $I_K+n_{start}$ in the second resource element set satisfies:

$$\alpha_{I_k+n_{start}}^{(p)} = \beta \times r^{(p)}(k), \text{and } k=0, \ldots, \text{or } M-1.$$

β is a scaling coefficient, and $n_{start}$ is a frequency domain start position of the transmit bandwidth of the first signal. According to this design, the first sequence may be mapped to the second resource element set, to ensure a transmit power constraint.

In a possible design, when the first resource element set includes the resource element that is on all the OFDM symbols in the first OFDM symbol group and that belongs to the transmit bandwidth of the first signal, the first OFDM symbol group includes N OFDM symbols, N is a positive integer greater than 1, and a first sequence $r^{(p)}(k,q)$ of the first uplink port on a $k^{th}$ resource element on a $q^{th}$ OFDM symbol in the first OFDM symbol group satisfies:

$$r^{(p)}(k,q)=r^{(\alpha,I_q)}(k).$$

$$r^{(\alpha,I_q)}(k) = e^{wj\alpha \frac{I_{q,k}+\Delta}{c}} \bar{r}(k + k_{start,q}),$$

$$q \in \{0, 1, \ldots, N-1\},$$

$\bar{r}(k)$ is a base sequence, $I_q$ is a set of frequency domain positions of resource elements corresponding to the $q^{th}$ OFDM symbol, the resource element corresponding to the $q^{th}$ OFDM symbol belongs to the second resource element set, $I_{q,k}$ indicates a frequency domain position of a $k^{th}$ resource element in a resource element set corresponding to the $q^{th}$ OFDM symbol, $k=0, \ldots,$ or $M_q-1$, $w=1$ or $w=-1$, $k_{start,q}$ is a start position of a sequence of the first uplink port on a $q^{th}$ symbol, the start position of the sequence is a non-negative integer, $\Delta$ is a constant, C is an integer greater than or equal to 1, p is the first uplink port, and a is a cyclic shift value. According to this design, a network device may perform joint processing, for example, perform joint channel estimation, on received first signals respectively corresponding to at least two of the N OFDM symbols of the first uplink port, to improve channel estimation precision. When this formula is used for generating the first sequence for a plurality of ports, the second resource element set may be code division multiplexed for first signals of the plurality of ports, to improve a multiplexing capability.

In a possible design, when the first signal is an SRS, $\alpha$ satisfies:

$$\alpha = 2\pi \frac{n_{SRS}^{cs}}{n_{SRS}^{cs,max}},$$

and $n_{SRS}^{cs} \in \{0, 1, \ldots, n_{SRS}^{cs,max}-1\}$. According to this design, when the second resource element set is code division multiplexed for SRS signals of a plurality of ports, and cyclic shift values are separately generated by using this formula, interference between the SRS signals of the plurality of ports can be reduced.

In a possible design, the terminal device may further receive $I_q$ and/or a parameter used for determining $I_q$, and/or receive $\alpha$ and/or $n_{SRS}^{cs}$. According to this design, a manner of receiving and processing an SRS signal by the terminal can be configured.

In a possible design, the first sequence is divided into R segments, a $u^{th}$ segment of the first sequence is carried on a resource element on the $q^{th}$ OFDM symbol, and a length of a $t^{th}$ segment is $S_t$, $t=0, \ldots,$ or $R-1$, $k_{start,q}=\Sigma_{t=0}^{u-1} S_t$, and $M_q=S_u$.

In a possible design, a first signal $a_{I_{q,k}+n_{start},L_q}^{(p)}$ corresponding to a resource element whose number is $I_{q,k}+n_{start}$ on the $q^{th}$ OFDM symbol satisfies:

$$a_{I_{q,k}+n_{start},L_q}^{(p)}=\beta \times r^{(p)}(k,q), k=0, \ldots, \text{or } M_q-1, \text{ and}$$
$$q=0,1, \ldots, \text{or } N-1.$$

$\beta$ is a scaling coefficient, $n_{start}$ is a frequency domain start position of the transmit bandwidth of the first signal, p is the first uplink port, and $L_q$ indicates a number of the $q^{th}$ OFDM symbol. According to this design, the first sequence may be mapped to the second resource element set, to ensure a transmit power constraint.

According to a second aspect, a communication method is provided. The method may be performed by a second communication apparatus. The second communication apparatus may be a communication device or a communication apparatus, for example, a chip, that can support the communication device in implementing a function required in the method. For example, the first communication apparatus is a network device, or a chip or another component that is disposed in the network device and that is configured to implement a function of the network device.

For example, a network device is used as an execution body. The method includes: The network device determines a second resource element set from a first resource element set. Frequency domain positions of all resource elements in the second resource element set are distributed at unequal intervals. The first resource element set includes a resource element that is on a first OFDM symbol and that belongs to a transmit bandwidth of a first signal, or the first resource element set includes a resource element that is on all OFDM symbols in a first OFDM symbol group and that belongs to the transmit bandwidth of the first signal. The first OFDM symbol group includes a plurality of OFDM symbols. The network device determines a first sequence of a first uplink port on each of the resource elements based on the frequency domain positions of all the resource elements in the second resource element set. The network device receives the first signal on each of the resource elements based on the first sequence.

In a possible design, when the first resource element set includes the resource element that is on the first OFDM symbol and that belongs to the transmit bandwidth of the first signal, a first sequence $r^{(p)}(k)$ of the first uplink port on a $k^{th}$ resource element in the second resource element set satisfies:

$$r^{(p)}(k)=r^{(\alpha,I)}(k).$$

$$r^{(\alpha,I)}(k) = e^{wj\alpha \frac{I_k+\Delta}{c}} \bar{r}(k),$$

$\bar{r}(k)$ is a base sequence, I is a set of the frequency domain positions of all the resource elements in the second resource element set, $I_k$ indicates a frequency domain position of the $k^{th}$ resource element in the second resource element set, $k=0, \ldots,$ or $M-1$, $w=1$ or $w=-1$, $\Delta$ is a constant, C is an integer greater than or equal to 1, p is the first uplink port, and $\alpha$ is a cyclic shift value.

In a possible design, when the first signal is an SRS, $\alpha$ satisfies:

$$\alpha = 2\pi \frac{n_{SRS}^{cs}}{n_{SRS}^{cs,max}},$$

and $n_{SRS}^{cs} \in \{0, 1, \ldots, n_{SRS}^{cs,max}-1\}$.

In a possible design, the network device may further send I and/or a parameter used for determining I, and/or send $\alpha$ and/or $n_{SRS}^{cs}$.

In a possible design, a first signal $a_{I_k+n_{start}}^{(p)}$ corresponding to a resource element whose number is $I_k+n_{start}$ in the second resource element set satisfies:

$$a_{I_k+n_{start}}^{(p)} = \beta \times r^{(p)}(k), \text{ and } k=0, \ldots, \text{or } M-1.$$

β is a scaling coefficient, and $n_{start}$ is a frequency domain start position of the transmit bandwidth of the first signal.

In a possible design, when the first resource element set includes the resource element that is on all the OFDM symbols in the first OFDM symbol group and that belongs to the transmit bandwidth of the first signal, the first OFDM symbol group includes N OFDM symbols, N is a positive integer greater than 1, and a first sequence $r^{(p)}(k,q)$ of the first uplink port on a $k^{th}$ resource element on a $q^{th}$ OFDM symbol in the first OFDM symbol group satisfies:

$$r^{(p)}(k,q) = r^{(\alpha, I_q)}(k).$$

$$\alpha = 2\pi \frac{n_{SRS}^{cs}}{n_{SRS}^{cs,max}},$$

and $$n_{SRS}^{cs} \in \{0, 1, \ldots, n_{SRS}^{cs,max} - 1\}.$$

$\bar{r}(k)$ is a base sequence, $I_q$ is a set of frequency domain positions of resource elements corresponding to the $q^{th}$ OFDM symbol, the resource element corresponding to the $q^{th}$ OFDM symbol belongs to the second resource element set, $I_{q,k}$ indicates a frequency domain position of a $k^{th}$ resource element in a resource element set corresponding to the $q^{th}$ OFDM symbol, k=0, . . . , or $M_q-1$, w=1 or w=−1, $k_{start,q}$ is a start position of a sequence of the first uplink port on a $q^{th}$ symbol, the start position of the sequence is a non-negative integer, Δ is a constant, C is an integer greater than or equal to 1, p is the first uplink port, and α is a cyclic shift value.

In a possible design, when the first signal is an SRS, α satisfies:

$$r_q^{(\alpha_q, I_q)}(k) = e^{wj\alpha_q \frac{I_{q,k}+\Delta_q}{c_q}} \bar{r}_q(k),$$

$$q \in \{0, 1, \ldots, N-1\},$$

In a possible design, the network device may further send $I_q$ and/or a parameter used for determining $I_q$, and/or send α and/or $n_{SRS}^{cs}$.

In a possible design, the first sequence is divided into R segments, a $u^{th}$ segment of the first sequence is carried on a resource element on the $q^{th}$ OFDM symbol, and a length of a $t^{th}$ segment is $S_t$, t=0, . . . , or R−1, $k_{start,q} = \sum_{t=0}^{u-1} S_t$, and $M_q = S_u$.

In a possible design, a first signal $a_{I_{q,k}+n_{start},L_q}^{(p)}$ corresponding to a resource element whose number is $I_{q,k}+n_{start}$ on the $q^{th}$ OFDM symbol satisfies:

$$a_{I_{q,k}+n_{start},L_q}^{(p)} = \beta \times r^{(p)}(k,q), k=0, \ldots, \text{or } M_q-1, \text{and}$$
$$q=0,1, \ldots, \text{or } N-1.$$

β is a scaling coefficient, $n_{start}$ is a frequency domain start position of the transmit bandwidth of the first signal, p is the first uplink port, and $L_q$ indicates a number of the $q^{th}$ OFDM symbol.

For beneficial effects of the second aspect, refer to descriptions of beneficial effects of the first aspect.

According to a third aspect, a communication method is provided. The method may be performed by a first communication apparatus. The first communication apparatus may be a communication device or a communication apparatus, for example, a chip, that can support the communication device in implementing a function required in the method. For example, the first communication apparatus is a terminal device, or a chip or another component that is disposed in the terminal device and that is configured to implement a function of the terminal device.

For example, a terminal device is used as an execution body. The method includes: The terminal device determines a plurality of second resource element sets from a first resource element set. Frequency domain positions of all resource elements in each second resource element set are distributed at unequal intervals. The first resource element set includes a resource element that is on a plurality of second OFDM symbols and that belongs to a transmit bandwidth of a first signal. Each second OFDM symbol corresponds to one second resource element set. The terminal device determines, based on frequency domain positions of all resource elements in any second resource element set, a first sequence of a first uplink port on each of the resource elements in the any second resource element set. The terminal device sends the first signal on each of the resource elements in the any second resource element set based on the first sequence.

According to the method, the terminal device determines, based on a frequency domain position of each resource element in any second resource element set of the plurality of second resource element sets, a transmit sequence of an uplink transmit port on the any second resource element set, to send the first signal on a non-uniform pilot resource. In comparison with a solution of sending the first signal on a uniform pilot resource, this can improve a port multiplexing capability.

In a possible example, each second OFDM symbol corresponds to one frequency hopping bandwidth, the frequency hopping bandwidth is within the transmit bandwidth of the first signal, two frequency hopping bandwidths corresponding to any two second OFDM symbols do not overlap in frequency domain, and a second resource element set corresponding to each second OFDM symbol belongs to a frequency hopping bandwidth corresponding to the second OFDM symbol.

In a possible example, a quantity of the plurality of second OFDM symbols is N, N is a positive integer greater than 1, and a first sequence $r^{(p)}(k,q)$ of the first uplink port on a $k^{th}$ resource element on a $q^{th}$ second OFDM symbol satisfies:

$$r^{(p)}(k,q) = r_q^{(\alpha_q, I_q)}(k).$$

$$r_q^{(\alpha_q, I_q)}(k) = e^{wj\alpha_q \frac{I_{q,k}+\Delta_q}{c_q}} \bar{r}_q(k),$$

$$q \in \{0, 1, \ldots, N-1\},$$

$\bar{r}_q(k)$ is a base sequence, $I_q$ is a set of frequency domain positions of all resource elements in a second resource element set corresponding to the $q^{th}$ second OFDM symbol, $I_{q,k}$ indicates a frequency domain position of a $k^{th}$ resource element in the second resource element set corresponding to the $q^{th}$ second OFDM symbol, k=0, . . . , or $M_q-1$, w=1 or w=−1, $\Delta_q$ is a constant, $C_g$ is an integer greater than or equal to 1, p is the first uplink port, and $\alpha_q$ is a cyclic shift value corresponding to the $q^{th}$ second OFDM symbol. According to this design, a network device may perform processing, for example, perform channel estimation, on a first signal corresponding to each OFDM symbol of the received N second OFDM symbols of the first uplink port. When this formula is used for generating a first sequence corresponding to each second resource element set for each of a plurality of ports, the second resource element set may be code division multiplexed for a plurality of first signals of the plurality of ports corresponding to each second resource element set, to improve a multiplexing capability.

In a possible example, when the first signal is an SRS, $\alpha_q$ satisfies:

$$\alpha_q = 2\pi \frac{n_{SRS}^{cs,q}}{n_{SRS}^{cs,max}},$$

and $$n_{SRS}^{cs,q} \in \{0, 1, \ldots, n_{SRS}^{cs,max} - 1\}.$$

In a possible example, the terminal device may further receive $I_q$ and/or a parameter used for determining $I_q$, and/or receive $\alpha_q$ and/or $n_{SRS}^{cs,q}$.

In a possible example, a first signal $a_{I_{q,k}+n_{start,q}L_q}^{(p)}$ corresponding to a resource element whose number is $I_{q,k}+n_{start,q}$ on the $q^{th}$ second OFDM symbol satisfies:

$$a_{I_{q,k}+n_{start,q}L_q}^{(p)} = \beta \times r^{(p)}(k,q), k=0, \ldots, \text{or } M_q-1, \text{and}$$
$$q=0,1,\ldots,\text{or } N-1.$$

$\beta$ is a scaling coefficient, $n_{start,q}$ is a frequency domain start position of a frequency hopping bandwidth corresponding to the $q^{th}$ second OFDM symbol, and $L_q$ indicates a number of the $q^{th}$ second OFDM symbol. According to this design, a first sequence corresponding to each second resource element set may be mapped to the second resource element set, to ensure a transmit power constraint.

According to a fourth aspect, a communication method is provided. The method may be performed by a second communication apparatus. The second communication apparatus may be a communication device or a communication apparatus, for example, a chip, that can support the communication device in implementing a function required in the method. For example, the second communication apparatus is a network device, or a chip or another component that is disposed in the network device and that is configured to implement a function of the network device.

For example, a network device is used as an execution body. The method includes: The network device determines a plurality of second resource element sets from a first resource element set. Frequency domain positions of all resource elements in each second resource element set are distributed at unequal intervals. The first resource element set includes a resource element that is on a plurality of second OFDM symbols and that belongs to a transmit bandwidth of a first signal. Each second OFDM symbol corresponds to one second resource element set. The network device determines, based on frequency domain positions of all resource elements in any second resource element set, a first sequence of a first uplink port on each of the resource elements in the any second resource element set. The network device receives the first signal on each of the resource elements in the any second resource element set based on the first sequence.

In a possible example, each second OFDM symbol corresponds to one frequency hopping bandwidth, the frequency hopping bandwidth is within the transmit bandwidth of the first signal, two frequency hopping bandwidths corresponding to any two second OFDM symbols do not overlap in frequency domain, and a second resource element set corresponding to each second OFDM symbol belongs to a frequency hopping bandwidth corresponding to the second OFDM symbol.

In a possible example, a quantity of the plurality of second OFDM symbols is N, N is a positive integer greater than 1, and a first sequence $r^{(p)}(k,q)$ of the first uplink port on a $k^{th}$ resource element on a $q^{th}$ second OFDM symbol satisfies:

$$r^{(p)}(k,q) = r_q^{(\alpha_q, I_q)}(k).$$

$$r_q^{(\alpha_q, I_q)}(k) = e^{wj\alpha_q \frac{I_{q,k}+\Delta_q}{C_q}} \bar{r}_q(k),$$

$$q \in \{0, 1, \ldots, N-1\},$$

$\bar{r}_q(k)$ is a base sequence, $I_q$ is a set of frequency domain positions of all resource elements in a second resource element set corresponding to the $q^{th}$ second OFDM symbol, $I_{q,k}$ indicates a frequency domain position of a $k^{th}$ resource element in the second resource element set corresponding to the $q^{th}$ second OFDM symbol, $k=0, \ldots,$ or $M_q-1$, $w=1$ or $w=-1$, $\Delta_q$ is a constant, $C_q$ is an integer greater than or equal to 1, p is the first uplink port, and $\alpha_q$ is a cyclic shift value corresponding to the $q^{th}$ second OFDM symbol.

In a possible example, when the first signal is an SRS, $\alpha_q$ satisfies:

$$\alpha_q = 2\pi \frac{n_{SRS}^{cs,q}}{n_{SRS}^{cs,max}},$$

and $$n_{SRS}^{cs,q} \in \{0, 1, \ldots, n_{SRS}^{cs,max} - 1\}.$$

In a possible example, the network device may further send $I_q$ and/or a parameter used for determining $I_q$, and/or send $\alpha_q$ and/or $n_{SRS}^{cs,q}$.

In a possible example, a first signal $a_{I_{q,k}+n_{start,q}L_q}^{(p)}$ corresponding to a resource element whose number is $I_{q,k}+n_{start,q}$ on the $q^{th}$ second OFDM symbol satisfies:

$$a_{I_{q,k}+n_{start,q}L_q}^{(p)} = \beta \times r^{(p)}(k,q), k=0, \ldots, \text{or } M_q-1, \text{and}$$
$$q=0,1,\ldots,\text{or } N-1.$$

$\beta$ is a scaling coefficient, $n_{start,q}$ is a frequency domain start position of a frequency hopping bandwidth corresponding to the $q^{th}$ second OFDM symbol, and $L_q$ indicates a number of the $q^{th}$ second OFDM symbol.

For beneficial effects of the fourth aspect, refer to descriptions of beneficial effects of the third aspect.

According to a fifth aspect, a communication apparatus is provided. A first communication apparatus is configured to perform the method performed by the first communication apparatus in any one of the first aspect or the possible implementations of the first aspect. Specifically, the communication apparatus may include modules configured to perform the method performed by the first communication apparatus in any one of the first aspect or the possible implementations of the first aspect. For example, the communication apparatus includes a processing module and a transceiver module. The first communication apparatus may be a terminal device or a component in the terminal device. For example, the transceiver module may include a sending module and a receiving module. The sending module and the receiving module may be different functional modules, or may be a same functional module that can implement different functions. For example, the first communication apparatus is a communication device, or is a chip or another component disposed in the communication device. For example, the communication device is a terminal device. The following uses an example in which the first communication apparatus is the terminal device. For example, the transceiver module may be implemented by using a transceiver, and the processing module may be implemented by using a processor. Alternatively, the sending module may be implemented by using a transmitter, and the receiving module may be implemented by using a receiver. The transmitter and the receiver may be different functional modules, or may be a same functional module that can implement different functions. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. When describing the fifth aspect, descriptions are made by using an example in which the first communication apparatus is the terminal device, and the processing module and the transceiver module are used.

For example, the communication apparatus may include a processing module (or a processor) and a transceiver module (or a transceiver). The transceiver module (or the transceiver) performs the receiving and/or sending actions performed by the first communication apparatus in the first aspect. The processing module (or the processor) performs the processing action performed by the first communication apparatus, and performs an action other than the receiving and sending actions in the first aspect.

When performing the method shown in the first aspect, the processing module or the processor may determine a second resource element set from a first resource element set, and determine, based on frequency domain positions of all resource elements in the second resource element set, a first sequence of a first uplink port on each of the resource elements. The transceiver module or the transceiver may be configured to send a first signal on each of the resource elements based on the first sequence.

For descriptions of the first resource element set, the second resource element set, and the first sequence, refer to the descriptions in the first aspect.

In a possible design, when the first signal is an SRS, and the first resource element set includes a resource element that is on a first OFDM symbol and that belongs to a transmit bandwidth of the first signal, the transceiver module or the transceiver may be further configured to receive I and/or a parameter used for determining I, and/or receive α and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the transceiver module or the transceiver may be further configured to receive $I_q$ and/or a parameter used for determining $I_q$, and/or receive α and/or $n_{SRS}^{cs}$.

According to a sixth aspect, a communication apparatus is provided. A second communication apparatus is configured to perform the method performed by the second communication apparatus in any one of the second aspect or the possible implementations of the second aspect. Specifically, the communication apparatus may include modules configured to perform the method performed by the second communication apparatus in any one of the second aspect or the possible implementations of the second aspect. For example, the communication apparatus includes a processing module and a transceiver module. For example, the transceiver module may include a sending module and a receiving module. The sending module and the receiving module may be different functional modules, or may be a same functional module that can implement different functions. For example, the second communication apparatus is a communication device, or is a chip or another component disposed in the communication device. For example, the communication device is a network device. The following uses an example in which the second communication apparatus is the network device. For example, the transceiver module may be implemented by using a transceiver, and the processing module may be implemented by using a processor. Alternatively, the sending module may be implemented by using a transmitter, and the receiving module may be implemented by using a receiver. The transmitter and the receiver may be different functional modules, or may be a same functional module that can implement different functions. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. When describing the sixth aspect, descriptions are made by using an example in which the second communication apparatus is the network device, and the processing module and the transceiver module are used.

For example, the communication apparatus may include a processing module (or a processor) and a transceiver module (or a transceiver). The transceiver module (or the transceiver) performs the receiving and/or sending actions performed by the second communication apparatus in the second aspect. The processing module (or the processor) performs the processing action performed by the second communication apparatus, and performs an action other than the receiving and sending actions in the second aspect.

When performing the method shown in the second aspect, the processing module or the processor may determine a second resource element set from a first resource element set, and determine, based on frequency domain positions of all resource elements in the second resource element set, a first sequence of a first uplink port on each of the resource elements. The transceiver module or the transceiver may be configured to receive α first signal on each of the resource elements based on the first sequence.

For descriptions of the first resource element set, the second resource element set, and the first sequence, refer to the descriptions in the second aspect.

In a possible design, when the first signal is an SRS, and the first resource element set includes a resource element that is on a first OFDM symbol and that belongs to a transmit bandwidth of the first signal, the transceiver module or the transceiver may be further configured to send I and/or a parameter used for determining I, and/or send a and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the transceiver module or the transceiver may be further configured to send $I_q$ and/or a parameter used for determining $I_q$, and/or send $\alpha$ and/or $n_{SRS}^{cs}$.

According to a seventh aspect, a communication apparatus is provided. A first communication apparatus is configured to perform the method performed by the first communication apparatus in any one of the third aspect or the possible implementations of the third aspect. Specifically, the communication apparatus may include modules configured to perform the method performed by the first communication apparatus in any one of the third aspect or the possible implementations of the third aspect. For example, the communication apparatus includes a processing module and a transceiver module. The first communication apparatus may be a terminal device or a component in the terminal device. For example, the transceiver module may include a sending module and a receiving module. The sending module and the receiving module may be different functional modules, or may be a same functional module that can implement different functions. For example, the first communication apparatus is a communication device, or is a chip or another component disposed in the communication device. For example, the communication device is a terminal device. The following uses an example in which the first communication apparatus is the terminal device. For example, the transceiver module may be implemented by using a transceiver, and the processing module may be implemented by using a processor. Alternatively, the sending module may be implemented by using a transmitter, and the receiving module may be implemented by using a receiver. The transmitter and the receiver may be different functional modules, or may be a same functional module that can implement different functions. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. When describing the seventh aspect, descriptions are made by using an example in which the first communication apparatus is the terminal device, and the processing module and the transceiver module are used.

For example, the communication apparatus may include a processing module (or a processor) and a transceiver module (or a transceiver). The transceiver module (or the transceiver) performs the receiving and/or sending actions performed by the first communication apparatus in the third aspect. The processing module (or the processor) performs the processing action performed by the first communication apparatus, and performs an action other than the receiving and sending actions in the third aspect.

When performing the method shown in the third aspect, the processing module or the processor may determine a plurality of second resource element sets from a first resource element set, and determine, based on frequency domain positions of all resource elements in any second resource element set, a first sequence of a first uplink port on each of the resource elements in the any second resource element set. The transceiver module or the transceiver may be configured to send a first signal on each of the resource elements in the any second resource element set based on the first sequence.

For descriptions of the first resource element set, the second resource element set, and the first sequence, refer to the descriptions in the third aspect.

In a possible design, when the first signal is an SRS, the transceiver module or the transceiver may be further configured to receive $I_q$ and/or a parameter used for determining $I_q$, and/or receive $\alpha_q$ and/or $n_{SRS}^{cs,q}$.

According to an eighth aspect, a communication apparatus is provided. A second communication apparatus is configured to perform the method performed by the second communication apparatus in any one of the fourth aspect or the possible implementations of the fourth aspect. Specifically, the communication apparatus may include modules configured to perform the method performed by the second communication apparatus in any one of the fourth aspect or the possible implementations of the fourth aspect. For example, the communication apparatus includes a processing module and a transceiver module. For example, the transceiver module may include a sending module and a receiving module. The sending module and the receiving module may be different functional modules, or may be a same functional module that can implement different functions. For example, the second communication apparatus is a communication device, or is a chip or another component disposed in the communication device. For example, the communication device is a network device. The following uses an example in which the second communication apparatus is the network device. For example, the transceiver module may be implemented by using a transceiver, and the processing module may be implemented by using a processor. Alternatively, the sending module may be implemented by using a transmitter, and the receiving module may be implemented by using a receiver. The transmitter and the receiver may be different functional modules, or may be a same functional module that can implement different functions. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. When describing the eighth aspect, descriptions are made by using an example in which the second communication apparatus is the network device, and the processing module and the transceiver module are used.

For example, the communication apparatus may include a processing module (or a processor) and a transceiver module (or a transceiver). The transceiver module (or the transceiver) performs the receiving and/or sending actions performed by the second communication apparatus in the fourth aspect. The processing module (or the processor) performs the processing action performed by the second communication apparatus, and performs an action other than the receiving and sending actions in the fourth aspect.

When performing the method shown in the fourth aspect, the processing module or the processor may determine a plurality of second resource element sets from a first resource element set, and determine, based on frequency domain positions of all resource elements in any second resource element set, a first sequence of a first uplink port on each of the resource elements in the any second resource element set. The transceiver module or the transceiver may be configured to receive a first signal on each of the resource elements in the any second resource element set based on the first sequence.

For descriptions of the first resource element set, the second resource element set, and the first sequence, refer to the descriptions in the fourth aspect.

In a possible design, when the first signal is an SRS, the transceiver module or the transceiver may be further configured to send $I_q$ and/or a parameter used for determining $I_q$, and/or send $\alpha_q$ and/or $n_{SRS}^{cs,q}$.

According to a ninth aspect, a communication system is provided. The communication system includes the communication apparatus shown in the fifth aspect and the communication apparatus shown in the sixth aspect, or includes the communication apparatus shown in the seventh aspect and the communication apparatus shown in the eighth aspect.

According to a tenth aspect, a computer-readable storage medium is provided. The computer-readable storage medium is configured to store computer instructions. When the computer instructions are run on a computer, the computer is enabled to perform the method in any one of the first aspect to the fourth aspect or the possible implementations of the first aspect to the fourth aspect.

According to an eleventh aspect, a computer program product including instructions is provided. The computer program product includes the computer instructions. When the computer instructions are run on a computer, the computer is enabled to perform the method in any one of the first aspect to the fourth aspect or the possible implementations of the first aspect to the fourth aspect.

According to a twelfth aspect, a circuit is provided. The circuit is coupled to a memory, and the circuit is configured to perform the method shown in any one of the first aspect to the fourth aspect or the possible implementations of the first aspect to the fourth aspect. The circuit may include a chip or a chip circuit.

DETAILED DESCRIPTION OF ILLUSTRATIVE EMBODIMENTS

To improve uplink channel estimation precision, this application provides a communication method. The following further describes in detail this application with reference to accompanying drawings. It should be understood that a specific operation method in a method embodiment described below may also be applied to an apparatus embodiment or a system embodiment.

Figure 1:
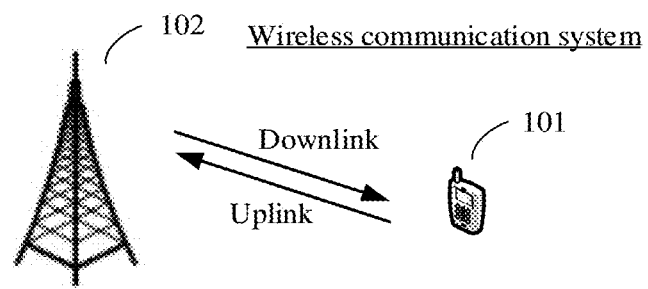
FIG. 1 is a schematic diagram of an architecture of a communication system according to an embodiment of this application.

As shown in FIG. 1, a measurement feedback method provided in embodiments of this application may be applied to a wireless communication system. The wireless communication system may include a terminal device 101 and a network device 102.

It should be understood that the foregoing wireless communication system is applicable to both a low-frequency scenario (sub 6G) and a high-frequency scenario (above 6G). An application scenario of the wireless communication system includes but is not limited to a fifth generation system, a new radio (NR) communication system, a future evolved public land mobile network (PLMN) system, or the like.

The terminal device 101 shown above may be user equipment (UE), a terminal, an access terminal, a terminal unit, a terminal station, a mobile station (MS), a remote station, a remote terminal, a mobile terminal, a wireless communication device, a terminal agent, a terminal device, or the like. The terminal device 101 may have a wireless transceiver function. The terminal device 101 can perform communication (for example, wireless communication) with one or more network devices in one or more communication systems, and accept a network service provided by the network device. The network device herein includes but is not limited to the network device 102 shown in the figure.

The terminal device 101 may be a cellular phone, a cordless phone, a session initiation protocol (SIP) phone, a wireless local loop (wireless local loop, WLL) station, a personal digital assistant (PDA) device, a handheld device having a wireless communication function, a computing device, another processing device connected to a wireless modem, a vehicle-mounted device, a wearable device, a terminal apparatus in a future 5G network, a terminal apparatus in a future evolved PLMN, or the like.

In addition, the terminal device 101 may be deployed on land, including an indoor or outdoor device, a handheld device, or a vehicle-mounted device. Alternatively, the terminal device 101 may be deployed on water (for example, on a ship). Alternatively, the terminal device 101 may be deployed in air (for example, on an aircraft, a balloon, or a satellite). The terminal device 101 may be specifically a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal device 101 may alternatively be a communication chip having a communication module, a vehicle having a communication function, a vehicle-mounted device (for example, an in-vehicle communication apparatus or an in-vehicle communication chip), or the like.

The network device 102 may be an access network device (or referred to as an access network site). The access network device is a device, for example, a radio access network (RAN) base station, that provides a network access function. The network device 102 may specifically include a base station (BS), or include a base station, a radio resource management device configured to control the base station, and the like. The network device 101 may further include a relay station, an access point, a base station in a future 5G network, a base station in a future evolved PLMN, an NR base station, or the like. The network device 102 may be a wearable device or a vehicle-mounted device. Alternatively, the network device 102 may be a chip having a communication module.

For example, the network device 102 includes but is not limited to a next generation NodeB (gNodeB, gNB) in 5G, an evolved NodeB (eNB) in an LTE system, a radio network controller (RNC), a radio controller in a CRAN system, a base station controller (BSC), a home base station (for example, a home evolved NodeB, or a home NodeB, HNB), a baseband unit (BBU), a transmission point (TRP), a transmitting point (TP), a mobile switching center, or the like. The network device 101 may further include a base station in a future 6G or newer mobile communication system.

Figure 2:
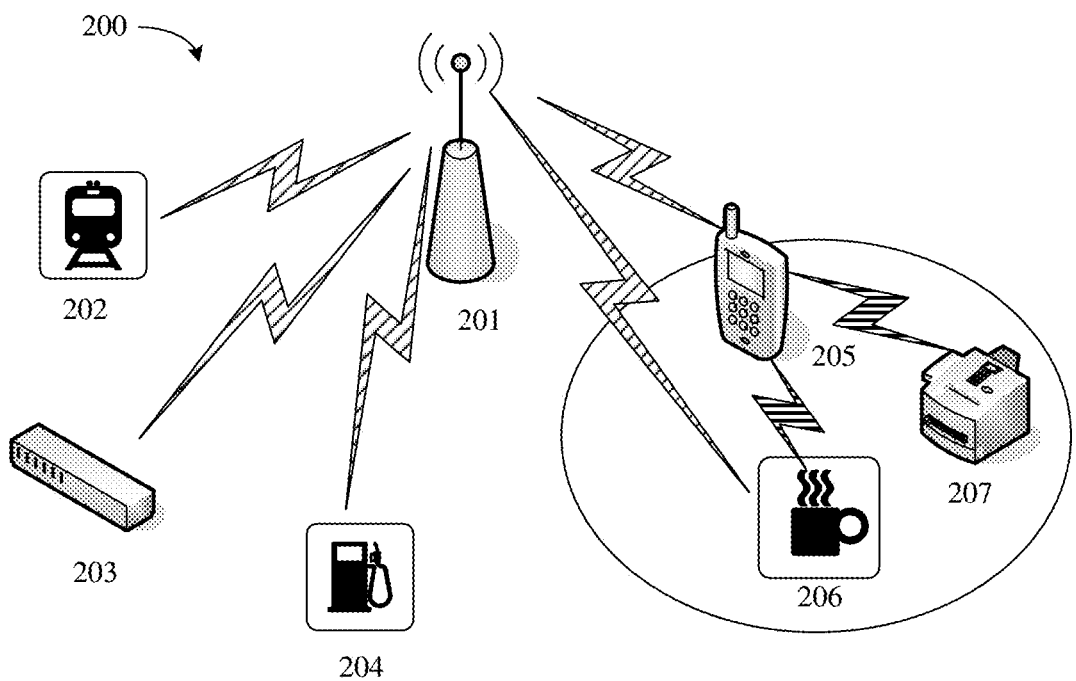
FIG. 2 is a schematic diagram of an architecture of another communication system according to an embodiment of this application.

In addition, as shown in FIG. 2, a communication system provided in this embodiment of this application may include at least one network device 201. The communication system 200 may further include at least one terminal device, for example, terminal devices 202 to 207 shown in FIG. 2. The terminal devices 202 to 207 may be movable or secured. The network device 201 may communicate with one or more of the terminal devices 202 to 207 through a radio link. Each network device may provide communication coverage for a particular geographic area, and may communicate with a terminal device located in the coverage area.

It should be understood that the network device 201 may include the network device 102 shown in FIG. 1. The terminal devices 202 to 207 may include the terminal device 101 shown in FIG. 1.

Optionally, direct communication may be implemented between any two or more terminal devices. For example, direct communication between terminal devices may be implemented by using a device-to-device (D2D) technology. As shown in the figure, direct communication between the terminal devices 205 and 206 and between the terminal devices 205 and 207 may be implemented by using the D2D technology. The terminal device 206 and the terminal device 207 may separately or simultaneously communicate with the terminal device 205.

Alternatively, the terminal devices 205 to 207 may separately communicate with the network device 201. For example, the terminal device may directly communicate with the network device 201. For example, the terminal devices 205 and 206 in the figure may directly communicate with the network device 201, or may indirectly communicate with the network device 201. For example, the terminal device 207 in the figure communicates with the network device 201 by using the terminal device 206.

The following uses the communication system shown in FIG. 1 as an example to describe a channel sounding manner in a conventional technology.

The channel sounding manner may include uplink channel sounding performed based on an uplink pilot signal (or referred to as an uplink sounding reference signal), and downlink channel sounding performed based on a downlink pilot signal (or referred to as a downlink sounding reference signal).

The typical downlink channel sounding is performed based on a downlink channel state information reference signal (CSI-RS). To be specific, the terminal device 101 measures, based on a CSI resource configuration sent by the network device 102, a CSI-RS signal sent by the network device 102, to obtain a downlink channel characteristic, and the terminal device 101 reports the downlink channel characteristic to the network device 102 based on a CSI reporting configuration sent by the network device 102.

The uplink channel sounding is generally performed based on the uplink sounding reference signal (SRS). To be specific, the network device 102 sends an SRS configuration to the terminal device 101, the terminal device 101 sends an SRS based on the SRS configuration, and the network device 102 measures the SRS sent by the terminal device 101, to obtain an uplink channel characteristic.

In this embodiment of this application, the SRS is used as an example. The SRS may also be replaced with a CSI-RS, a demodulation reference signal (demodulation reference resource, DMRS), a time domain/frequency domain/phase tracking reference signal, or the like. The CSI-RS may be used for obtaining channel information, to perform CSI measurement on a reported known signal. The DMRS may be used as a known signal for channel estimation during receiving of a shared channel or a control channel.

The following describes terms used in the present invention.

Sounding Reference Signal

UE generates an SRS on a specific physical resource based on a preset known sequence and sends the SRS. A base station side may obtain a channel matrix through estimation by using the received SRS on the specific physical resource based on the known sequence, to perform uplink data scheduling or perform downlink data scheduling by using channel reciprocity. For example, in a conventional technology, a Zadoff-Chu (ZC) sequence is used for generating the SRS. The SRS may be located on one or more OFDM symbols in one slot, and may occupy all subcarriers in a system bandwidth, or may occupy a part of the subcarriers in the system bandwidth in a comb form, so that utilization of network resources is improved.

The SRS may be periodically sent in time domain. A transmit periodicity and offset are usually defined, and the SRS is periodically sent at a periodic time domain position. The SRS may alternatively be sent aperiodically in time domain. In this case, DCI signaling needs to indicate a transmit moment of the SRS, and the SRS is sent instantaneously at a periodic time domain position.

An SRS resource defines a time-frequency code domain resource used for sending the SRS. Specifically, the following parameters are configured for each SRS resource.

Index value of an SRS resource: When a plurality of SRS resources are configured, the SRS resources are distinguished by using index values.

Quantity of SRS ports: Usually, the quantity of SRS ports may be a quantity of transmit antennas of UE. In this case, each SRS port corresponds to one transmit antenna of the UE, and each SRS port may correspond to one spatial domain precoding vector of the transmit antenna, that is, may correspond to one spatial beamforming manner. Usually, SRS signals of a plurality of SRS ports on one SRS resource occupy a same time-frequency resource, and are multiplexed in a code division manner. For example, SRS signals of different SRS ports use different cyclic shifts (CSs).

Time domain position occupied by an SRS: configuration information of a time domain periodicity or offset.

The configuration information indicates a transmit bandwidth and a frequency hopping bandwidth of the SRS.

CS value is also referred to as a cyclic shift value, which is a quantity of bits for a cyclic shift of a sequence in time domain. On a same time-frequency resource, different SRS signals or different SRS ports may avoid mutual interference in an orthogonal manner of code division multiplexing. The orthogonal manner may be implemented through a cyclic shift. When a delay spread of a channel is small, a CS can basically implement code division orthogonality. A receiving end may cancel, through a specific operation, a signal using another CS and reserve only a signal using a specific CS, to implement code division multiplexing.

Transmit Bandwidth of an SRS

The transmit bandwidth of the SRS refers to a sounding bandwidth of the SRS, that is, a frequency domain range in which channel estimation is performed based on the SRS. A channel corresponding to the transmit bandwidth may be estimated by using a subcarrier carrying the SRS. The SRS may be carried only on a part of subcarriers in the transmit bandwidth for estimating the entire transmit bandwidth. Subsequently, the transmit bandwidth of the SRS may be referred to as an SRS bandwidth for short.

Further, the transmit bandwidth of the SRS may correspond to frequency domain resources occupied by the SRS at a same moment or different moments. For example, when a frequency hopping mode of the SRS is configured, the SRS needs a plurality of moments to scan a complete transmit bandwidth. Only a part of the transmit bandwidth is scanned at each moment, and the part of the bandwidth is a frequency hopping bandwidth. For example, if the transmit bandwidth of the SRS is 272 RBs and the frequency hopping mode is not configured, the SRS occupies 272 RBs in one OFDM symbol. For another example, if the transmit bandwidth of the SRS is 272 RBs, the frequency hopping mode is configured, and a quantity of frequency hopping times is 4, the SRS occupies 68 RBs in one OFDM symbol, in other words, the frequency hopping bandwidth is 68 RBs, the SRS occupies 272 RBs in four OFDM symbols, and frequency domain resources occupied by the OFDM symbols do not overlap.

System Bandwidth

The system bandwidth indicates a frequency domain range in which a base station and a terminal device communicate with each other to receive and send a signal. The system bandwidth in embodiments of this application may be understood as one carrier (component carrier, CC), one bandwidth part (bandwidth part, BWP), or the like. One CC may include a plurality of BWPs.

Number of a Subcarrier

To define a position of a subcarrier, subcarriers are numbered in the present invention, and subcarriers with different numbers (or referred to as frequency domain numbers) have different frequency domain positions. Usually, a group of subcarriers may be consecutively numbered in ascending order or descending order of frequencies. A subcarrier is numbered relative to a specific frequency domain range. For example, a number of a specific subcarrier in a system bandwidth, or a number of a subcarrier relative to the system bandwidth means that a number of a subcarrier with a highest frequency or a lowest frequency in the system bandwidth is denoted as 0, and subcarriers in the system bandwidth are sequentially numbered in descending order or ascending order of frequencies. Therefore, the number of the specific subcarrier in the system bandwidth is determined.

Frequency Domain Start Position

A frequency domain start position of an SRS bandwidth is a largest value or a smallest value in numbers of subcarriers included in the SRS bandwidth, and the number may be a number relative to a system bandwidth.

A frequency domain start position of a frequency hopping bandwidth is a largest value or a smallest value in numbers of subcarriers included in the frequency hopping bandwidth, and the number may be a number relative to the system bandwidth.

Frequency Domain Position of a Resource Element (Resource Element, RE)

The frequency domain position of the resource element is a difference between a number of a subcarrier occupied by the resource element in a system bandwidth and a frequency domain start position of an SRS bandwidth, or is a difference between the number of the subcarrier occupied by the resource element in the system bandwidth and a frequency domain start position of a frequency hopping bandwidth. In this application, the number of the subcarrier occupied by the resource element may be referred to as a number of the resource element for short.

Figure 3:
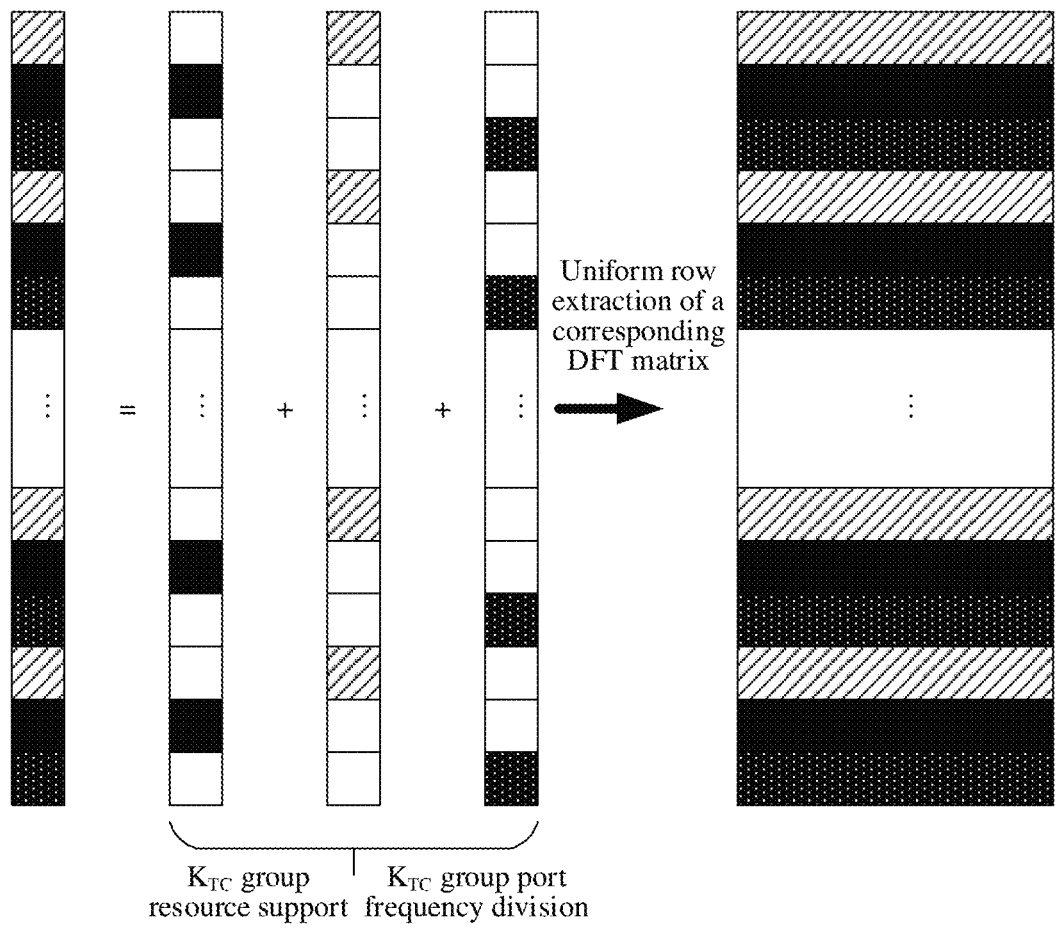
FIG. 3 is a schematic diagram of distribution of an SRS in frequency domain.

In a current solution for sending an SRS, SRSs are arranged in an equi-spaced comb manner in frequency domain. For example, as shown in FIG. 3, a frequency domain resource occupies $m_{SRS}$ RBs, and a comb degree is $K_{TC}$. In this case, the frequency domain is divided into $K_{TC}$ groups of resources, a quantity of pilots in each group is $M_{sc}^{SRS} = m_{SRS} N_{sc}^{RB}/K_{TC}$, and $N_{sc}^{RB}$ is a quantity of subcarriers in each RB.

A plurality of ports (the port may be one transmit antenna of one terminal device, and the plurality of ports may be a plurality of transmit antennas from a plurality of terminal devices) send an SRS signal on one comb (one group of frequency domain resources with a same shadow, in other words, the plurality of ports occupy a same frequency domain resource), and the SRS signal is multiplexed through code division.

Figure 4:
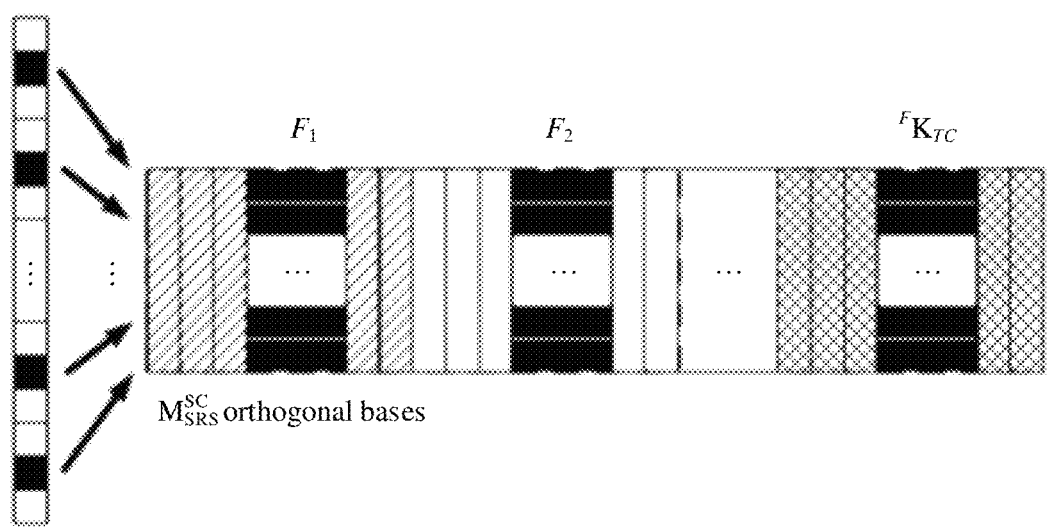
FIG. 4 is a schematic diagram of an SRS pilot resource and a corresponding DFT matrix.

The following uses $M_{sc}^{SRS}$ pilots as an example to describe a maximum quantity of ports supported by one comb for code division multiplexing. As shown in FIG. 4, a port multiplexing capability is determined by a property of a partial discrete Fourier transform (DFT) matrix corresponding to a pilot.

A transform relationship between a frequency domain channel and a delay domain channel on $m_{SRS} N_{sc}^{RB}$ pilots of a frequency domain resource is determined by a DFT matrix $\overline{F}$ whose side length is $m_{SRS} N_{sc}^{RB}$, and the delay domain channel may be solved based on the frequency domain channel and the matrix $\overline{F}$.

Further, if $M_{sc}^{SRS}$ pilot resources are selected from $m_{SRS}N_{sc}^{RB}$ pilot resources, and it is expected to solve the delay domain channel by using a receive pilot on the MS s pilot resources, a partial DFT matrix F (for example, $F_1$, $F_2$, ..., or $F_{K_{TC}}$) corresponding to the $M_{sc}^{SRS}$ pilot resources needs to be studied.

Each pilot corresponds to one row of the DFT matrix $\bar{F}$, $M_{sc}^{SRS}$ rows of the DFT matrix $\bar{F}$ corresponding to $M_{sc}^{SRS}$ pilots form the partial DFT matrix F, and a property of F determines a port multiplexing capability on the $M_{sc}^{SRS}$ pilot resources.

If the $M_{sc}^{SRS}$ pilot resources are uniformly extracted from $K_{TC}$ combs of the $m_{SRS}N_{sc}^{RB}$ pilot resources, as shown in FIG. 4, F is a matrix of $M_{sc}^{SRS} \times m_{SRS}N_{sc}^{RB}$, and each column of F may be considered as a base with a length $M_{sc}^{SRS}$, and is sequentially divided into $K_{TC}$ groups, where each group has $M_{sc}^{SRS}$ bases. The $M_{sc}^{SRS}$ bases of each group are completely orthogonal, but corresponding columns of different groups are completely linearly related. For example, a first column of F1 is completely linearly related to a first column of F2, and a second column of F1 is completely linearly related to a second column of F2. Therefore, when a plurality of ports are multiplexed, only $M_{sc}^{SRS}$ bases are available (another base is linearly related to the bases of this group, in other words, the another base cannot be distinguished mathematically from the bases of this group). Assuming that a maximum delay spread of each port is L, a maximum quantity of multiplexed ports is $$\frac{M_{sc}^{SRS}}{L}.$$

It can be learned that when SRS pilot resources are uniformly extracted, only the $M_{sc}^{SRS}$ bases are available, and the maximum quantity of multiplexed ports is $$\frac{M_{sc}^{SRS}}{L},$$

which results in a limited port multiplexing capability.

If the $M_{sc}^{SRS}$ pilot resources are non-uniformly extracted from the $m_{SRS}N_{sc}^{RB}$ pilot resources, in other words, a frequency domain position of an SRS is obtained in a non-uniform extraction manner, a phenomenon that corresponding columns of different groups are completely linearly related in a conventional technology does not occur, that is, $m_{SRS}N_{sc}^{RB}$ bases formed by $m_{SRS}N_{sc}^{RB}$ columns are all available. Assuming that the maximum delay spread of each port is L, a maximum quantity of multiplexed ports is $$\frac{m_{SRS}N_{sc}^{RB}}{L}.$$

It can be learned that, in comparison with the conventional technology, more ports may be multiplexed on a same frequency domain resource for an SRS whose frequency domain resources are non-uniformly distributed.

Because a length of the $m_{SRS}N_{sc}^{RB}$ bases is $M_{sc}^{SRS}$, in other words, a quantity of the bases is greater than a length of the bases, the $m_{SRS}N_{sc}^{RB}$ bases cannot be completely orthogonal, that is, are a group of non-orthogonal bases. Actually, positions of the $M_{sc}^{SRS}$ pilot resources may be designed (the positions of the pilot resources determine F), so that columns of F are orthogonal as much as possible.

An embodiment of this application provides a communication method, to send an SRS based on non-uniformly distributed pilot resources. Therefore, more ports are multiplexed on a same frequency domain resource, and a port multiplexing capability is improved.

The communication method may be implemented by a first communication apparatus or a second communication apparatus. The first communication apparatus may include a terminal device or a component (for example, a processor, a circuit, a chip, or a chip system) in the terminal device. The terminal device herein is, for example, the terminal device 101 shown in FIG. 1. The second communication apparatus may include a network device or a component (for example, a processor, a circuit, a chip, or a chip system) in the network device. The network device herein is the network device 102 shown in FIG. 1.

Figure 5:
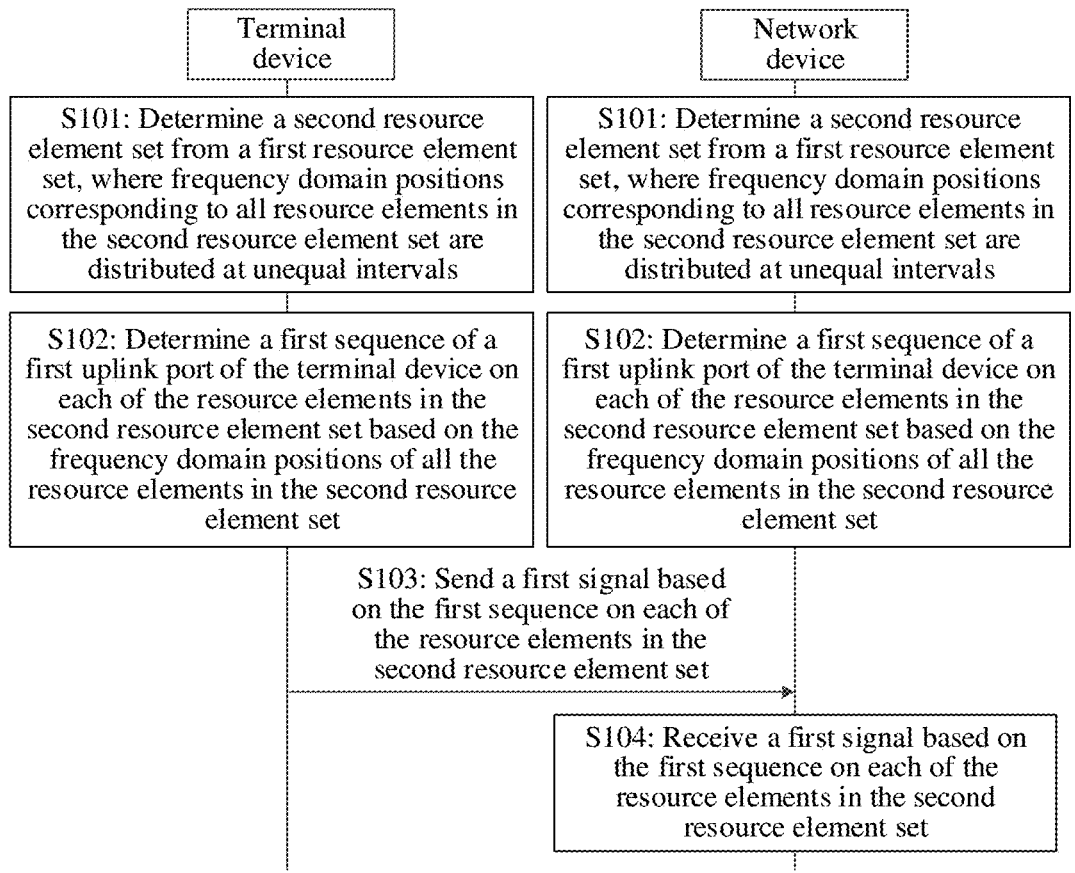
FIG. 5 is a schematic flowchart of a communication method according to an embodiment of this application.

As shown in FIG. 5, the method may include the following steps.

S101: A terminal device and a network device determine a second resource element set from a first resource element set (or determine a second resource element set in a first resource element set), where frequency domain positions of all resource elements in the second resource element set are distributed at unequal intervals.

In other words, when a first signal is sent based on the resource elements in the second resource element set, frequency domain positions of the first signal are distributed at unequal intervals. The first resource element set may include all resource elements in a first signal bandwidth range. The second resource element set includes a set of non-uniformly distributed resource elements obtained based on the first resource element set. For example, the second resource element set is a set of resource elements obtained through non-uniform extraction from the first resource element set. The first signal herein is, for example, an SRS or another uplink reference signal. A first signal bandwidth may be a transmit bandwidth of the first signal. For example, in this application, an SRS bandwidth is a transmit bandwidth of an SRS.

The first resource element set is a set of resource elements that are on a first orthogonal frequency division multiplexing (orthogonal frequency division multiplexing, OFDM) symbol and that belong to the transmit bandwidth of the first signal. Alternatively, the first resource element set is a set of resource elements that are on all OFDM symbols in a first OFDM symbol group and that belong to the transmit bandwidth of the first signal, where the first OFDM symbol group includes a plurality of OFDM symbols.

For example, the first signal is an SRS. The first resource element set is a set of resource elements that are on a first OFDM symbol and that belong to an SRS bandwidth. Alternatively, the first resource element set is a set of resource elements that are on all OFDM symbols in a first OFDM symbol group and that belong to the SRS bandwidth, where the first OFDM symbol group includes a plurality of OFDM symbols.

Figure 6:
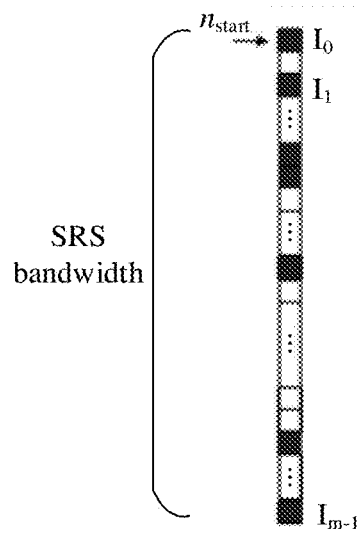
FIG. 6 is a schematic diagram of distribution of an SRS in frequency domain according to an embodiment of this application.

Optionally, resource elements in the first resource element set may be distributed on the first OFDM symbol. For example, as shown in FIG. 6, a first resource element set includes resource elements in an SRS bandwidth range on a first OFDM symbol, and a second resource element set may include a plurality of resource elements non-uniformly distributed in the first resource element set. A distribution manner of the first resource element set shown in FIG. 6 may be referred to as a non-frequency hopping manner.

As shown in FIG. 6, a frequency domain position of each resource element in the second resource element set is indicated by $I_0, I_1, \ldots, \ldots,$ or $I_{M-1}$. For example, a number of a subcarrier occupied by each resource element in the second resource element set is indicated by $I_0, I_1, \ldots, \ldots,$ or $I_{M-1}$, or a difference between the number of the subcarrier occupied by each resource element in the second resource element set and a number of a reference subcarrier is indicated by $I_0, I_1, \ldots, \ldots,$ or $I_{M-1}$. Resource elements in the second resource element set are non-uniformly distributed, or resource elements respectively indicated by $I_0, I_1, \ldots, \ldots,$ or $I_{M-1}$ are non-uniformly distributed, or $I_0, I_1, \ldots, \ldots,$ or $I_{M-1}$ are not in an arithmetic progression.

Optionally, resource elements in the first resource element set may be distributed on a plurality of OFDM symbols. When the resource elements are distributed on the plurality of OFDM symbols, the plurality of OFDM symbols may be referred to as a first OFDM symbol group, and the plurality of OFDM symbols may be located in a same time unit. It should be understood that in this application, the time unit may be a slot (slot), or may include some slots or a plurality of slots. A distribution manner of a first resource element set shown in FIG. 7 may be referred to as a first frequency hopping manner.

Figure 7:
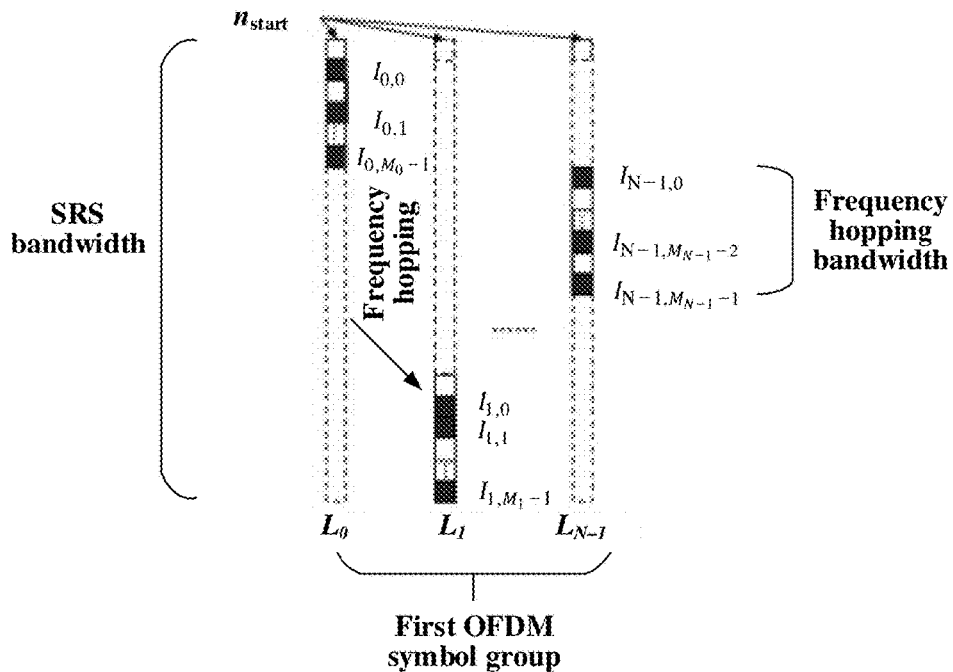
FIG. 7 is a schematic diagram of another distribution of an SRS in frequency domain according to an embodiment of this application.

For another example, as shown in FIG. 7, resource elements in the first resource element set may be distributed in a frequency domain range of SRS bandwidths on N OFDM symbols, where N≥2, $L_q$ indicates a number of a $q^{th}$ OFDM symbol in the N OFDM symbols. When the N OFDM symbols belong to a same slot, the number may be a number of each OFDM symbol in the slot, for example, $L_q = q + q_0$, and $q_0$ is a positive integer. When the N OFDM symbols belong to at least two different slots, the number may be a number of a slot in which each OFDM symbol is located and a number of the OFDM symbol in the slot. OFDM symbols $L_0$ and $L_1$ to $L_{N-1}$ are a first OFDM symbol group, where each OFDM symbol corresponds to one frequency hopping bandwidth, and each frequency hopping bandwidth includes one or more resource elements. Optionally, frequency domain ranges of frequency hopping bandwidths of different OFDM symbols are not repeated. To be specific, a number of a subcarrier occupied by a resource element in a frequency hopping bandwidth of any OFDM symbol in the first OFDM symbol group is different from a number of a subcarrier occupied by a resource element in a frequency hopping bandwidth of another OFDM symbol in the first OFDM symbol group. For example, each OFDM symbol includes at least one resource element in a frequency hopping bandwidth corresponding to the OFDM symbol, and a union set of resource elements in frequency hopping bandwidths of all OFDM symbols in the first OFDM symbol group includes a second resource element set.

As shown in FIG. 7, a frequency domain position of each resource element in the second resource element set is indicated by $I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{N-1}-2},$ or $I_{N-1,M_{N-1}-1}$. Frequency domain positions respectively indicated by $I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{N-1}-2},$ and $I_{N-1,M_{N-1}-1}$ (that is, frequency domain positions of resource elements in the second resource element set) are non-uniformly distributed, or $I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{N-1}-2},$ and $I_{N-1,M_{N-1}-1}$ are not in an arithmetic progression. It should be understood that, that $I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{N-1}-2},$ and $I_{N-1,M_{N-1}-1}$ are non-uniformly distributed means that after being sorted in ascending order or descending order, they are not in the arithmetic progression.

$I_{0,0}, I_{0,1}, \ldots,$ and $I_{0,M_0-1}$ belong to an OFDM symbol $L_0$, $I_{1,0}, I_{1,1}, \ldots,$ and $I_{1,M_1-1}$ belong to an OFDM symbol $L_1$, and $I_{N-1,0}, \ldots, I_{N-1,M_{N-1}-2},$ and $I_{N-1,M_{N-1}-1}$ belong to an OFDM symbol $L_{N-1}$.

For the terminal device, the terminal device may obtain a non-uniformly distributed second resource element set based on the first resource element set in a specified manner, or may determine the second resource element set based on frequency domain information of a resource element in the second resource element set from the network device. The frequency domain information may indicate a relative frequency domain position of the resource element in the second resource element set in the transmit bandwidth of the first signal, or indicate a frequency domain position of the resource element in a system. Optionally, a manner of obtaining the non-uniformly distributed second resource elements based on the first resource element set is not specifically limited in this application.

S102: The terminal device and the network device determine a first sequence of a first uplink port of the terminal device on each of the resource elements in the second resource element set based on the frequency domain positions of all the resource elements in the second resource element set. For the terminal device, the first sequence may also be referred to as a transmit sequence, and for the network device, the first sequence may be referred to as a receiving sequence.

Optionally, a first sequence determined by the terminal device is the same as a first sequence determined by the network device.

For example, for FIG. 6, a first sequence sent through a first uplink port on a second resource element set may be determined based on frequency domain positions respectively indicated by $I_0, I_1, \ldots,$ and $I_{M-1}$. For FIG. 7, a first sequence sent through a first uplink port on a second resource element set included in a plurality of OFDM symbols may be determined based on frequency domain positions respectively indicated by $I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{N-1}-2},$ and $I_{N-1,M_{N-1}-1}$.

S103: The terminal device sends the first signal on each of the resource elements in the second resource element set based on the first sequence. The first signal includes an SRS, a CSI-RS, a DMRS, or another uplink reference signal.

In other words, the terminal device sends the first sequence or a signal corresponding to the first sequence on each of the resource elements in the second resource element set.

S104: The network device receives the first signal on each of the resource elements in the second resource element set based on the first sequence.

In other words, the network device receives the first sequence or the signal corresponding to the first sequence on each of the resource elements in the second resource element set.

For example, FIG. 6 is used as an example to describe a process of sending and receiving a first sequence. As shown in FIG. 6, a terminal device may map a first sequence to M subcarriers $I_0, I_1, \ldots,$ and $I_{M-1}$, to generate a first signal carried on the M subcarriers, and send the first signal by using a radio frequency. The first signal is, for example, an SRS or another uplink reference signal. Each subcarrier may be in a mapping relationship with a subsequence of the first sequence. In this application, the subsequence may be a part of the first sequence. Correspondingly, the network device receives, based on the first sequence, the first signal that is sent by the terminal and that is carried on the subcarriers $I_0$, $I_1, \ldots$, and $I_{M-1}$.

It should be understood that the foregoing subcarrier mapping process or step is merely an example for description. In an actual process of sending the first signal, other processing may be performed. This is not specifically limited in this application.

According to the foregoing method, the terminal device and the network device may determine a transmit sequence of each uplink transmit port on the second resource element set based on a frequency domain position of each resource element in the second resource element set, to send and receive an SRS on a non-uniform pilot resource. In comparison with a solution of sending the SRS on a uniform pilot resource, this can improve a port multiplexing capability.

In an implementation, the method may further include S105: The network device performs channel estimation based on the first signal. Optionally, the network device performs data demodulation based on the first signal. The first signal is sent on the resource element in the second resource element set based on the first sequence.

Optionally, the network device may also first obtain the first sequence, and then receive the first signal based on the first sequence. To distinguish this from descriptions that the first sequence is sent by the terminal side, the first sequence herein may be referred to as a local first sequence. It should be understood that the step of obtaining the first sequence and the step of receiving the first signal may be interchanged.

In an alternative step, the network device may not obtain the first sequence, but store, generate, or determine a local sequence. After receiving the first signal, the network device determines, based on the local sequence and the first signal, the first sequence sent by the terminal side. It should be understood that the local sequence may be a plurality of sequences, for example, a plurality of sequence sets that may be determined by the terminal as the first sequence. The network device performs comparison with the plurality of sequences based on the received first signal, and determines that the first signal is one of the plurality of sequences. It should be understood that the local sequence may not be completely the first sequence, for example, only the first several items in the first sequence may be stored, provided that the first sequence corresponding to the first signal sent by the terminal device can be determined.

Further, based on S101 and S102, the terminal device may further determine a mapping relationship between the first sequence of the first uplink port and the resource element in the second resource element set based on position indication information of a reference subcarrier, and send the first signal based on a first sequence of each uplink port and a mapping relationship between a first sequence of each port and a resource element. For example, the first signal is an SRS. The reference subcarrier is, for example, a first subcarrier (or any other subcarrier) of an SRS bandwidth. The position indication information of the reference subcarrier may indicate a number of the first subcarrier in a system bandwidth.

Correspondingly, the network device receives, based on the first sequence and the mapping relationship between the first sequence and the resource element in the second resource element set, the first signal sent through the first uplink port.

Similarly, the terminal device may determine, in a traversal manner, a transmit sequence of each uplink port and/or a mapping relationship between the transmit sequence and the resource element in the second resource element set. Therefore, when sending first signals through a plurality of uplink ports, the network device may determine, in a similar manner, transmit sequences of all uplink ports and/or a mapping relationship between the transmit sequence and the resource element in the second resource element set, to receive the first signals sent through all the uplink ports.

The following describes, based on distribution manners of frequency domain resources shown in FIG. 6 and FIG. 7, a method for sending a first signal according to an embodiment of this application. In FIG. 6 and FIG. 7, a first signal SRS is used as an example for description. When the first signal is another uplink reference signal, a method for sending the first signal may be implemented with reference to FIG. 6 and FIG. 7.

As shown in FIG. 6, when a non-frequency hopping solution is used, in other words, when all resource elements in a first resource element set belong to a same OFDM symbol, it is assumed that a bandwidth of the first resource element set is an SRS bandwidth, where the SRS bandwidth is mRB, that is, $mN_{sc}^{RB}$ resource elements (resource elements, REs). After a non-uniformly distributed second resource element set is obtained based on the first resource element set, a set of frequency domain positions (where the set of frequency domain positions may be referred to as a first frequency domain position set) of resource elements in the obtained second resource element set is represented as I. Therefore, for FIG. 6, I is frequency domain information. As shown in FIG. 6, $I=\{I_0, I_1 \ldots I_{M-1}\}$. It should be understood that the resource elements in the second resource element set are non-uniformly distributed, or values of $I_0, I_1, \ldots, \ldots$, and $I_{M-1}$ are not in an arithmetic progression.

A first sequence $r^{(p)}(k)$ of a first uplink port on a $k^{th}$ resource element in the second resource element set satisfies the following formula:

$$r^{(p)}(k)=r^{(\alpha,l)}(k). \qquad \text{(Formula 1)}$$

$$r^{(\alpha,l)}(k) = e^{wj\alpha \frac{I_k+\Delta}{C}} \bar{r}(k),$$

and $\bar{r}(k)$ is a base sequence. I is the first frequency domain position set, including the frequency domain positions of all the resource elements in the second resource element set. $I_k$ is a $k^{th}$ element in the first frequency domain position set, or $I_k$ indicates a $k^{th}$ frequency domain position in the first frequency domain position set, or $I_k$ indicates a frequency domain position of the $k^{th}$ resource element in the second resource element set. $k=0, \ldots$, or $M-1$, $w=1$ or $w=-1$, $\Delta$ is a constant, for example, 0, C is an integer greater than or equal to 1, p is the first uplink port, and a is a cyclic shift value.

It should be understood that the $k^{th}$ resource element in the second resource element set is a $k^{th}$ resource element obtained through sorting all the resource elements in the second resource element set in descending order or ascending order of frequency domain.

It should be noted that the foregoing $\bar{r}(k)$ may be determined by using v (or $\bar{r}(k)$ is related to v), where v is a number of a base sequence, $\bar{r}(k)$ may be written as $\bar{r}_v(k)$, and $r^{(\alpha,l)}(k)$ may be written as $r_v^{(\alpha,l)}(k)$. Alternatively, the foregoing $\bar{r}(k)$ may be determined by using u and v (or $\bar{r}(k)$ is related to u and v), where u is a number of a group, v is a number of a base sequence in the group, $\bar{r}(k)$ may be written as $\bar{r}_{u,v}(k)$, and $r^{(\alpha,I)}(k)$ may be written as $r_{u,v}^{(\alpha,I)}(k)$. It should be understood that the foregoing examples do not constitute a limitation on the solutions of the present invention, and the base sequencer $\bar{r}(k)$ may be determined by using another parameter.

It should be noted that the foregoing I may be determined by using $\{A^0, A^1, \ldots, A^{b-1}\}$, which are a total of B parameters. These parameters are parameters used for determining I, B is an integer greater than or equal to 1, I may be written as $I_{A^0, A^1, \ldots, A^{B-1}}$, $I_k$ may be written as $I_{A^0, A^1, \ldots, A^{B-1}, k}$, and M may be written as $M_{A^0, A^1, \ldots, A^{B-1}}$. In this application, $\{A^0, A^1, \ldots, A^{B-1}\}$ may be referred to as parameters used for determining I, and the parameters used for determining I may be used for determining I.

In a possible example, in Formula 1, when the first signal is an SRS, $\alpha$ satisfies:

$$\alpha = 2\pi \frac{n_{SRS}^{cs}}{n_{SRS}^{cs,max}}. \quad \text{(Formula 2)}$$

$n_{SRS}^{cs} \in \{0, 1, \ldots, n_{SRS}^{cs,max}-1\}$. Values of $n_{SRS}^{cs}$ and/or $n_{SRS}^{cs,max}$ may be indicated by the network device. $n_{SRS}^{cs,max}$ may be a maximum code division value.

It is assumed that a start position of the transmit bandwidth of the first signal is $n_{start}$. In other words, a frequency domain position of a first resource element in the first resource element set in the system bandwidth is $n_{start}$. Optionally, a first signal $a_{I_k+n_{start}}^{(p)}$ corresponding to a resource element whose number is $I_k+n_{start}$ (or a subcarrier occupied by the resource element whose number is $I_k+n_{start}$) in the second resource element set satisfies:

$$a_{I_k+n_{start}}^{(p)} = \beta \times r^{(p)}(k), \text{and } k=0, \ldots, \text{or } M-1. \quad \text{(Formula 3)}$$

$\beta$ is a scaling coefficient. A correspondence between the resource element whose number is $I_k+n_{start}$ and a sequence $a_{I_k+n_{start}}^{(p)}$ may be that the sequence $a_{I_k+n_{start}}^{(p)}$ is carried on the resource element whose number is $I_k+n_{start}$, or the sequence $a_{I_k+n_{start}}^{(p)}$ is mapped to the resource element whose number is $I_k+n_{start}$.

It should be understood that, in S103, the first uplink port of the terminal device sends, on each resource element in the second resource element set, a first signal corresponding to a resource element determined according to Formula 3. In addition, if the terminal device sends the first signal through a plurality of uplink ports, for a manner of determining a signal sent through another uplink port other than the first uplink port, refer to the manner of determining a signal sent through the first uplink port.

Correspondingly, in S104, the network device receives, on each resource element in the second resource element set, the first signal sent by the terminal device through the first uplink port, where a first signal corresponding to each resource element satisfies Formula 3. In addition, if the terminal device sends the first signal through the plurality of uplink ports, the network device may receive first signals respectively sent through the plurality of uplink ports. For a manner of determining a signal sent through another uplink port, refer to the manner of determining a signal sent through the first uplink port.

In this application, the system bandwidth is, for example, a bandwidth part (bandwidth part, BWP). It should be understood that, on a resource element that does not belong to the second resource element set, transmit power of the first signal of the first uplink port is zero. In other words, a mapping relationship between the first sequence (or the first signal) and the resource element in the second resource element set satisfies Formula 3.

The foregoing I, C, $\Delta$, $\alpha$, $n_{SRS}^{cs}$, u, v, $A^0, A^1, \ldots,$ and $A^{B-1}$ are configured for the first uplink port. Optionally, one or more parameters of I, C, $\Delta$, $\alpha$, $n_{SRS}^{cs}$, u, v, $A^0, A^1, \ldots,$ and $A^{B-1}$ corresponding to different first uplink ports may be different. In other words, when the first uplink port is a $p_i^{th}$ port of the plurality of uplink ports of the terminal device, one or more parameters of I, C, $\Delta$, $\alpha$, $n_{SRS}^{cs}$, u, v, $A^0, A^1, \ldots,$ and $A^{B-1}$ may have a subscript i, which are parameters corresponding to the $p_i^{th}$ port.

It should be noted that the scaling coefficient $\beta$ may be determined by using one or more of an amplitude scaling parameter, a power control parameter, and a quantity of transmitted pilots, and the scaling coefficient $\beta$ may be different for different uplink ports.

In the example shown in FIG. 6, at least one of I, the parameter used for determining I, $\alpha$, or $n_{SRS}^{cs}$ may be sent by the network device to the terminal device. For example, the network device may send I and/or the parameter used for determining I to the terminal device, and/or the network device may send $\alpha$ or $n_{SRS}^{cs}$ to the terminal device.

When all resource elements in the first resource element set belong to the plurality of OFDM symbols in the first OFDM symbol group shown in FIG. 7, a bandwidth of the first resource element set may be an SRS bandwidth, where the SRS bandwidth is mRB, that is, $mN_{sc}^{RB}$ REs. It should be understood that each OFDM symbol in the first OFDM group corresponds to one frequency hopping bandwidth, and the frequency hopping bandwidth is within the SRS bandwidth, and $n_{start}$ is a frequency domain start position of the SRS bandwidth.

After a non-uniformly distributed second resource element set is obtained based on the first resource element set shown in FIG. 7, a set of frequency domain positions (the set of frequency domain positions may be referred to as a first frequency domain position set) of resource elements in the second resource element set is represented as I. As shown in FIG. 7, $I = \{I_{0,0}, I_{0,1}, \ldots, I_{0,M_0-1}, I_{1,0}, I_{1,1}, \ldots, I_{1,M_1-1}, I_{N-1,0}, \ldots, I_{N-1,M_{n-1}-2}, I_{N-1,M_{N-1}-1}\}$. $I_{q,k}$ may indicate a frequency domain position of a $k^{th}$ resource element in a resource element set corresponding to a $q^{th}$ OFDM symbol in the first OFDM symbol group, $q=0, \ldots,$ or $N-1$, and $k=0, \ldots,$ or $M_q-1$. In other words, a resource element set corresponding to the $q^{th}$ OFDM symbol belongs to the second resource element set, or the resource element corresponding to the $q^{th}$ OFDM symbol is a subset of the second resource element set. It should be understood that the resource elements in the second resource element set are non-uniformly distributed in frequency domain.

In addition, $I_q$ is a set of frequency domain positions of resource elements corresponding to the $q^{th}$ OFDM symbol, as shown in FIG. 7, and $r^{(p)}(k,q)$.

Optionally, a first sequence $r^{(p)}(k,q)$ of the first uplink port on the $k^{th}$ resource element on the $q^{th}$ OFDM symbol satisfies:

$$r^{(p)}(k,q) = r^{(\alpha,I_q)}(k). \quad \text{(Formula 4)}$$

$$r^{(\alpha,I_q)}(k) = e^{\frac{wj\alpha I_{q,k}+\Delta}{C}} \bar{r}(k+k_{start,q}), q \in \{0, 1, \ldots, N-1\},$$

$\bar{r}(k)$ is a base sequence, $I_q$ is a set of frequency domain positions of resource elements corresponding to the $q^{th}$ OFDM symbol, $k_{start,q}$ is a start position of a sequence of the first uplink port on a $q^{th}$ symbol, w=1 or w=−1, Δ is a constant, for example, o, C is an integer greater than or equal to 1, p is the first uplink port, and α is a cyclic shift value.

It should be understood that the $k^{th}$ resource element in the $q^{th}$ OFDM symbol refers to a $k^{th}$ resource element obtained through sorting resource elements on the $q^{th}$ symbol belonging to the second resource element set in descending or ascending order of frequency domain.

It should be noted that the foregoing $\bar{r}(k)$ may be determined by using v (or $\bar{r}(k)$ is related to v), where v is a number of a base sequence, $\bar{r}(k)$ may be written as $\bar{r}_v(k)$, and $r^{(\alpha,I_q)}(k)$ may be written as $r_v^{(\alpha,I_q)}(k)$. Alternatively, the foregoing $\bar{r}(k)$ may be determined by using u and v (or is related to u and v), where u is a number of a group, v is a number of a base sequence in the group, $\bar{r}(k)$ may be written as $\bar{r}_{u,v}(k)$, and $r^{(\alpha,I_q)}(k)$ may be written as $r_{u,v}^{(\alpha,I_q)}(k)$. It should be understood that the foregoing examples do not constitute a limitation on the solutions of the present invention, and the base sequencer $\bar{r}(k)$ may be determined by using another parameter.

It should be noted that the foregoing $I_q$ may be determined by using $\{A^0, A^1, \ldots, A^{B-1}\}$, which are a total of B parameters. These parameters are parameters used for determining $I_q$, B is an integer greater than or equal to 1, $I_q$ may be written as $I_{A_q^0, A_q^1, \ldots, A_q^{B-1}}$, $I_{q,k}$ may be written as $I_{A_q^0, A_q^1, \ldots, A_q^{B-1}, k}$, and $M_q$ may be written as $M_{A_q^0, A_q^1, \ldots, A_q^{B-1}}$. In this application, $\{A^0, A^1, \ldots, A^{B-1}\}$ may be referred to as parameters used for determining $I_q$, and the parameters used for determining $I_q$ may be used for determining $I_q$.

Optionally, when the first signal is an SRS, α in Formula 4 satisfies:

$$\alpha = 2\pi \frac{n_{SRS}^{cs}}{n_{SRS}^{cs,max}}, \text{ and } n_{SRS}^{cs} \in \{0, 1, \ldots, n_{SRS}^{cs,max} - 1\}. \quad \text{(Formula 5)}$$

The foregoing $I_q$, C, Δ, α, $n_{SRS}^{cs}$, u, v, and $A_q^0$, $A_q^1, \ldots, A_q^{B-1}$ are configured for the first uplink port. Optionally, one or more parameters of $I_q$, C, Δ, α, $n_{SRS}^{cs}$, u, v, and $A_q^0, A_q^1, \ldots, A_q^{B-1}$ corresponding to different first uplink ports may be different. In other words, when the first uplink port is a $p_i^{th}$ port of the plurality of uplink ports of the terminal device, one or more parameters of $I_q$, C, Δ, α, $n_{SRS}^{cs}$, u, v, and $A_q^0, A_q^1, \ldots, A_q^{B-1}$ may have a subscript i, representing parameters corresponding to the $p_i^{th}$ port.

Optionally, if one or more parameters of $I_q$, $A_q^0$, $A_q^1, \ldots,$ and $A_q^{B-1}$ are the same for all q=0, . . . , or N−1, a subscript q may be removed.

Optionally, in S103 and/or S104, when the resource elements in the first resource element set are distributed in a frequency domain range of SRS bandwidths of N OFDM symbols, each OFDM symbol corresponds to a subsequence segment of the first sequence. In other words, a part of the first signal is sent on a resource element on each OFDM symbol based on a part of the first sequence. In the N OFDM symbols, parts of the first sequence respectively corresponding to at least two OFDM symbols are not completely the same. The network device may perform joint processing, for example, perform joint channel estimation, on parts of the first signal respectively corresponding to the at least two of the N OFDM symbols, to improve channel estimation precision. N≥2.

For example, when the first resource element set shown in FIG. 7 is used, the first sequence may be divided into R segments, and a $u^{th}$ sequence segment in the R segments of the first sequence may be carried on a $q^{th}$ OFDM symbol in the first OFDM symbol group. If a length of a $t^{th}$ segment is $S_t$, and t=0, . . . , or R−1, $k_{start,q}$ may satisfy:

$$k_{start,q} = \Sigma_{t=0}^{u-1} S_t \quad \text{(Formula 6)}$$

In addition/Alternatively, $M_q$ may satisfy:

$$M_q = S_u. \quad \text{(Formula 7)}$$

Optionally, when the second resource element set is determined in the manner shown in FIG. 7, a first signal $a_{I_{q,k}+n_{start},L_q}^{(p)}$ corresponding to a resource element (or a subcarrier corresponding to the resource element) whose number is $I_{q,k}+n_{start}$ on the $q^{th}$ OFDM symbol satisfies:

$$a_{I_{q,k}+n_{start},L_q}^{(p)} = \beta \times r^{(p)}(k,q), k=0, \ldots, \text{or } M_q-1, \text{and}$$
$$q=0,1,\ldots,\text{or } N-1. \quad \text{(Formula 8)}$$

β is a scaling coefficient. It should be understood that, on a resource element that does not belong to the second resource element set, transmit power of the first signal of the first uplink port is zero. In other words, a mapping relationship between the first sequence (or the first signal) and the resource element in the second resource element set satisfies Formula 8.

It should be understood that, in S103, the first uplink port of the terminal device sends, on each resource element in the second resource element set, a first signal corresponding to a resource element determined according to Formula 8. In addition, if the terminal device sends the first signal through a plurality of uplink ports, for a manner of determining a signal sent through another uplink port other than the first uplink port, refer to the manner of determining a signal sent through the first uplink port.

Correspondingly, in S104, the network device receives, on each resource element in the second resource element set, the first signal sent by the terminal device through the first uplink port, where a first signal corresponding to each resource element satisfies Formula 8. In addition, if the terminal device sends the first signal through the plurality of uplink ports, the network device may receive first signals respectively sent through the plurality of uplink ports. For a manner of determining a signal sent through another uplink port, refer to the manner of determining a signal sent through the first uplink port.

It should be noted that the scaling coefficient β may be determined by using one or more of an amplitude scaling parameter, a power control parameter, and a quantity of transmitted pilots, and the scaling coefficient β may be different for different uplink ports or may be different for different OFDM symbols.

In the example shown in FIG. 7, at least one of $I_q$, the parameter used for determining $I_q$, α, or $n_{SRS}^{cs}$ may be sent by the network device to the terminal device. For example, the network device may send $I_q$ and/or the parameter used for determining $I_q$ to the terminal device, and/or the network device may send α or $n_{SRS}^{cs}$ to the terminal device.

Figure 8:
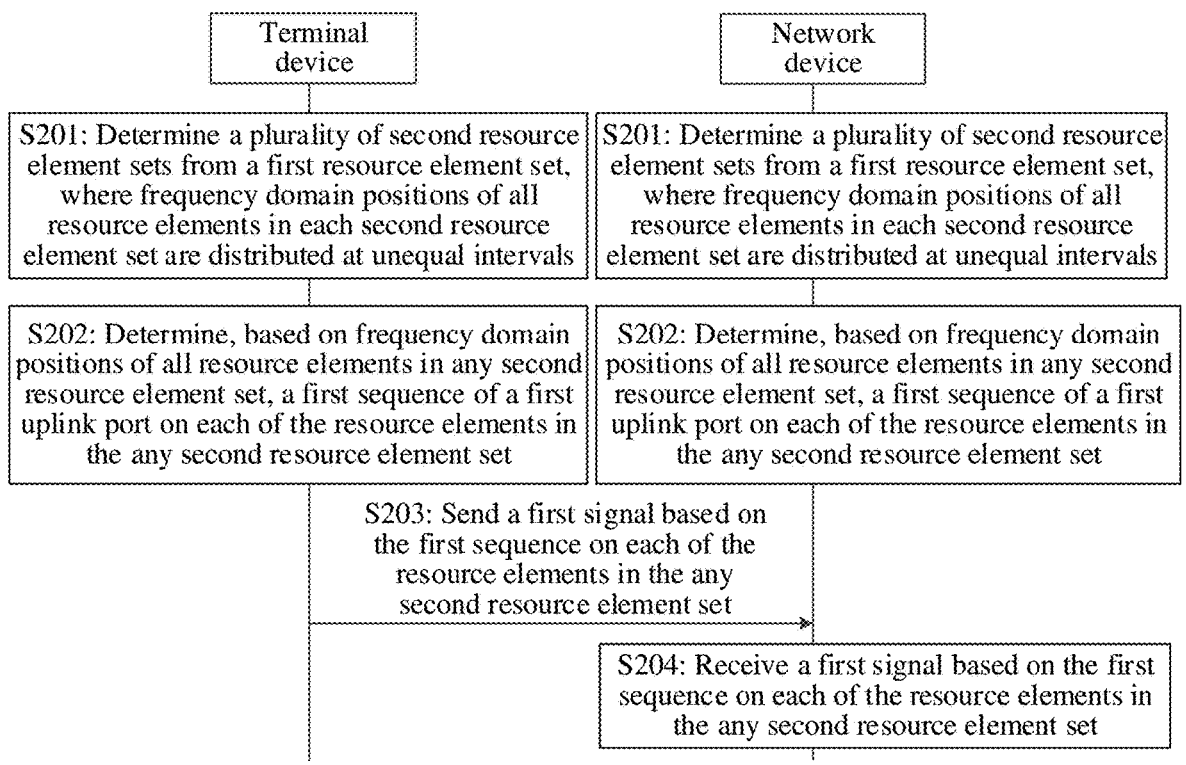
FIG. 8 is a schematic flowchart of another communication method according to an embodiment of this application.

Similar to the procedure shown in FIG. 5, a procedure shown in FIG. 8 shows another communication method according to an embodiment of this application. The method may include the following steps.

S201: A terminal device and a network device determine a plurality of second resource element sets from a first resource element set, where frequency domain positions of all resource elements in each second resource element set are distributed at unequal intervals. In other words, when a first signal is sent, frequency domain resources of the first signal are non-uniformly distributed. In other words, when the first signal is sent based on the resource elements in the second resource element set, the frequency domain resources of the first signal are non-uniformly distributed.

The first resource element set is a set of resource elements that are on a plurality of (for example, N, N≥2) second OFDM symbols and that belong to a first signal bandwidth, and each second OFDM symbol corresponds to one second resource element set. The N second OFDMs may be located in a same time unit. It should be understood that in this application, the time unit may be a slot (slot), or may include some slots or a plurality of slots. The first signal herein is, for example, an SRS or another uplink reference signal. The first signal bandwidth may be a transmit bandwidth of the first signal.

Figure 9:
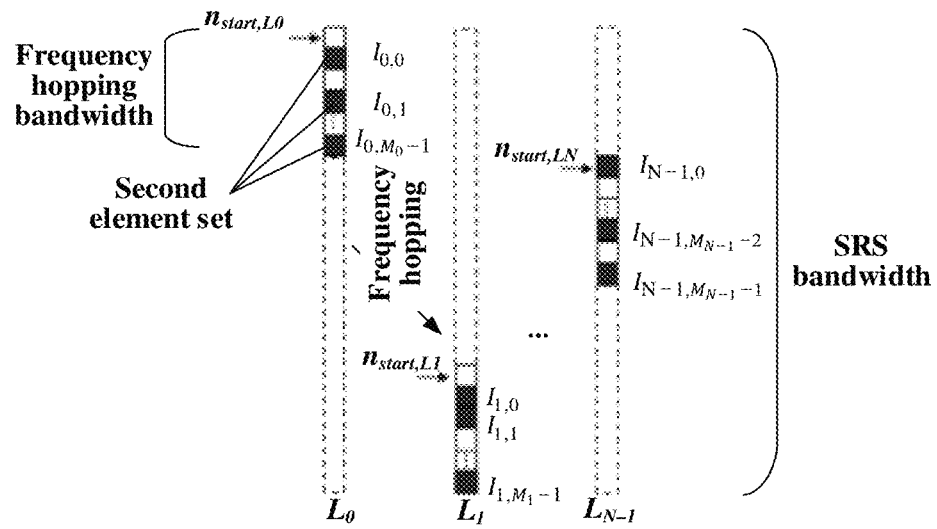
FIG. 9 is a schematic diagram of another distribution of an SRS in frequency domain according to an embodiment of this application.

For example, the first signal is an SRS. As shown in FIG. 9, a number of a $q^{th}$ OFDM symbol in the N second OFDM symbols is indicated by $L_q$. When the N second OFDM symbols belong to a same slot, the number may be a number of each second OFDM symbol in the slot. When the N second OFDM symbols belong to at least two different slots, the number may be a combination of a number of a slot in which each second OFDM symbol is located and a number of the second OFDM symbol in the slot. Each second OFDM symbol corresponds to one frequency hopping bandwidth, the frequency hopping bandwidth is within an SRS bandwidth, two frequency hopping bandwidths corresponding to any two second OFDM symbols do not overlap in frequency domain, and a second resource element set corresponding to each second OFDM symbol belongs to a frequency hopping bandwidth corresponding to the second OFDM symbol. For example, resource elements in any second resource element set shown in FIG. 9 are non-uniformly distributed.

As shown in FIG. 9, frequency domain position information of a $k^{th}$ resource element in a second resource element set on the $q^{th}$ second OFDM symbol is $I_{q,k}$, q=0, ..., or N−1, and k=0, ..., or $M_q$−1. $I_{0,0}$, $I_{0,1}$, ..., and $I_{0,M_0-1}$ belong to a second OFDM symbol $L_0$, and a set formed by them is denoted as $I_0$. $I_{1,0}$, $I_{1,1}$, ..., and $I_{1,M_1-1}$ belong to a second OFDM symbol $L_1$, and a set formed by them is denoted as $I_1$. $I_{N-1,0}$, ..., $I_{N-1,M_{N-1}-2}$, and $I_{N-1,M_{N-1}-1}$ belong to a second OFDM symbol $L_{N-1}$, and a set formed by them is denoted as $I_{N-1}$.

The terminal device may obtain a non-uniformly distributed second resource element set from the first resource element set in a specified manner, or may determine the second resource element set based on frequency domain information of the resource elements in the second resource element set from the network device. The network device may obtain the non-uniformly distributed second resource element set from the first resource element set in a specified manner, and send the frequency domain information of the resource elements in the second resource element set to the terminal. A manner of obtaining the non-uniformly distributed second resource element set based on the first resource element set is not specifically limited in this application.

S202: The terminal device and the network device determine, based on frequency domain positions of all resource elements in any second resource element set, a first sequence of a first uplink port on each of the resource elements in the any second resource element set. For the terminal device, the first sequence may also be referred to as a transmit sequence, and for the network device, the first sequence may be referred to as a receiving sequence.

Optionally, a first sequence determined by the terminal device is the same as a first sequence determined by the network device.

S203: The terminal device sends the first signal on each of the resource elements in the any second resource element set based on the first sequence.

In other words, the terminal device sends the first sequence on each of the resource elements in the any second resource element set. The first signal is, for example, an SRS.

S204: The network device receives the first signal on each of the resource elements in the any second resource element set based on the first sequence.

In other words, the network device receives the first sequence on each of the resource elements in the any second resource element set.

It should be understood that the SRS shown above may be replaced with a DMRS or another uplink reference signal.

For example, for a process of sending and receiving the first sequence, refer to the foregoing descriptions of S103 and S104.

According to the foregoing method, the terminal device determines, based on a frequency domain position of each resource element in any second resource element set of the plurality of second resource element sets, a transmit sequence of an uplink transmit port on the any second resource element set, to send the SRS on a non-uniform pilot resource. In comparison with a solution of sending the SRS on a uniform pilot resource, this can improve a port multiplexing capability.

It should be understood that the steps shown in S202 to S204 may also be separately performed in different second resource element sets, to implement sending of a plurality of first sequences and a plurality of first signals. In other words, the steps shown in S202 to S204 may be separately performed in a plurality of second resource element sets. For example, based on the plurality of second resource element sets obtained in S201, the terminal device and the network device may determine at least two second resource element sets from the plurality of second resource element sets, and determine, for a first second resource element set of the at least two second resource element sets, a first sequence of a first uplink port on each of resource elements in the first second resource element set. Further, the terminal device sends an uplink signal on each of the resource elements in the first second resource element set based on the first sequence, and the network device receives the uplink signal on each of the resource elements in the first second resource element set based on the first sequence. Similarly, the terminal device and the network device may further determine, for an $m^{th}$ second resource element set in the at least two second resource element sets, a first sequence of a first uplink port (or another uplink port) on each of resource elements in the $m^{th}$ second resource element set, where m is a positive integer. Further, the terminal device may send an uplink signal on each of the resource elements in the $m^{th}$ second resource element set based on the first sequence, and the network device may receive the uplink signal on each of the resource elements in the $m^{th}$ second resource element set based on the first sequence.

In an implementation, the method may further include S2o5: The network device performs channel estimation based on the first signal. Optionally, the network device performs data demodulation based on the first signal. The first signal is sent on the resource element in the second resource element set based on the first sequence.

Optionally, the network device may also first obtain the first sequence, and then receive the first signal based on the first sequence. To distinguish this from descriptions that the first sequence is sent by the terminal side, the first sequence herein may be referred to as a local first sequence. It should be understood that the step of obtaining the first sequence and the step of receiving the first signal may be interchanged.

In an alternative step, the network device may not obtain the first sequence, but store, generate, or determine a local sequence. After receiving the first signal, the network device determines, based on the local sequence and the first signal, the first sequence sent by the terminal side. It should be understood that the local sequence may be a plurality of sequences, for example, a plurality of sequence sets that may be determined by the terminal as the first sequence. The network device performs comparison with the plurality of sequences based on the received first signal, and determines that the first signal is one of the plurality of sequences. It should be understood that the local sequence may not be completely the first sequence, for example, only the first several items in the first sequence may be stored, provided that the first sequence corresponding to the first signal sent by the terminal device can be determined.

Further, based on S201 and S202, the terminal device may further determine a mapping relationship between the first sequence of the first uplink port and the resource element in the second resource element set based on position indication information of a reference subcarrier, and send the first signal based on a first sequence of each uplink port and a mapping relationship between a first sequence of each port and a resource. The reference subcarrier is, for example, a first subcarrier of a frequency hopping bandwidth corresponding to a second OFDM symbol. The position indication information of the reference subcarrier may indicate a number of the first subcarrier in a system bandwidth.

Correspondingly, the network device receives, based on the first sequence and the mapping relationship between the first sequence and the resource element, the first signal sent through the first uplink port.

Similarly, the terminal device may determine, in a traversal manner, a transmit sequence of each uplink port and/or a mapping relationship between the transmit sequence and the resource element. Therefore, when sending first signals through a plurality of uplink ports, the network device may determine, in a similar manner, transmit sequences of all uplink ports and/or a mapping relationship between the transmit sequence and the resource element, to receive the first signals sent through all the uplink ports.

The following uses an example in which the first signal is an SRS to describe, based on a distribution manner of frequency domain resources shown in FIG. 9, a method for sending the first signal according to an embodiment of this application.

As described above, $I_{q,k}$ is a frequency domain position of a $k^{th}$ resource element in a second resource element set corresponding to a $q^{th}$ second OFDM symbol. In other words, $I_{q,k}$ indicates the frequency domain position of the $k^{th}$ resource element in the second resource element set corresponding to the $q^{th}$ second OFDM symbol.

In addition, $I_q$ is a set of frequency domain positions of resource elements in the second resource element set corresponding to the $q^{th}$ second OFDM symbol, and $I_q=\{I_{q,0}, I_{q,1} \ldots I_{q,M_q-1}\}$. That is, for FIG. 9, $I_q$ is frequency domain information.

Optionally, a first sequence of a first uplink port on the $k^{th}$ resource element on the $q^{th}$ second OFDM symbol satisfies:

$$r^{(p)}(k,q) = r_q^{(\alpha_q, I_q)}(k). \quad \text{(Formula 9)}$$

$$r_q^{(\alpha_q, I_q)}(k) = e^{wj\alpha \frac{I_{q,k}+\Delta_q}{C_q}} \bar{r}_q(k), q \in \{0, 1, \ldots, N-1\},$$

$\bar{r}_q(k)$ is a base sequence, and p is the first uplink port. w=1 or w=−1, $\Delta_q$ is a constant, $C_q$ is an integer greater than or equal to 1, and $\alpha_q$ is a cyclic shift value corresponding to the $q^{th}$ second OFDM symbol.

It should be understood that the $k^{th}$ resource element on the $q^{th}$ second OFDM symbol refers to a $q^{th}$ resource element obtained through sorting the resource elements in the second resource element set corresponding to the $q^{th}$ second OFDM symbol in descending or ascending order of frequency domain.

It should be noted that the foregoing $\bar{r}_q(k)$ may be determined by using v (or $\bar{r}_q(k)$ is related to v), where v is a number of a base sequence, $\bar{r}_q(k)$ may be written as $\bar{r}_{v_q}(k)$, and $r_q^{(\alpha_q, I_q)}(k)$ may be written as $r_{v_q}^{(\alpha_q, I_q)}(k)$. Alternatively, the foregoing $\bar{r}_q(k)$ may be determined by using u and v (or $\bar{r}_q(k)$ is related to u and v), where u is a number of a group, v is a number of a base sequence in the group, $\bar{r}_q(k)$ may be written as $\bar{r}_{u_q,v_q}(k)$, and $r_q^{(\alpha_q, I_q)}(k)$ may be written as $$r_{u_q,v_q}^{(\alpha_q, I_q)}(k).$$

It should be understood that the foregoing examples do not constitute a limitation on the solutions of the present invention, and the base sequence $\bar{r}_q(k)$ may be determined by using another parameter.

It should be noted that the foregoing $I_q$ may be determined by using $\{A^0, A^1, \ldots, A^{B-1}\}$, which are a total of B parameters. B is an integer greater than or equal to 1, $I_q$ may be written as $I_{A_q^0, A_q^1, \ldots, A_q^{B-1}}$, $I_{q,k}$ may be written as $I_{A_q^0, A_q^1, \ldots, A_q^{B-1},k}$, and $M_q$ may be written as $M_{A_q^0, A_q^1, \ldots, A_q^{B-1}}$. In this application, $\{A^0, A^1, \ldots, A^{B-1}\}$ may be referred to as parameters used for determining $I_q$, and the parameters used for determining $I_q$ may be used for determining $I_q$.

When the first signal is an SRS, $\alpha_q$ in Formula 9 may satisfy:

$$\alpha_q = 2\pi \frac{n_{SRS}^{cs,q}}{n_{SRS}^{cs,max}}, \text{ and } n_{SRS}^{cs,q} \in \{0, 1, \ldots, n_{SRS}^{cs,max} - 1\}.$$

Optionally, when the second resource element set is determined in the manner shown in FIG. 9, a first signal $a_{I_{q,k}+n_{start,q} \cdot L_q}^{(p)}$ corresponding to a resource element (or a subcarrier occupied by the resource element) whose number is $I_{q,k}+n_{start,q}$ on the $q^{th}$ OFDM symbol satisfies:

$$a_{I_{q,k}+n_{start,q} \cdot L_q}^{(p)} = \beta \times r^{(p)}(k,q), k=0, \ldots, \text{or } M_q-1, \text{and}$$
$$q=0,1, \ldots, \text{or } N-1. \quad \text{(Formula 10)}$$

$\beta$ is a scaling coefficient, p is the first uplink port, and $L_q$ indicates a number of the $q^{th}$ second OFDM symbol in a plurality of second OFDM symbols. In other words, a mapping relationship between the first sequence (or the first signal) and the resource element in the second resource element set satisfies Formula 10.

It should be understood that in S203, the first uplink port of the terminal device sends, on each of the resource elements in the any second resource element set, the first signal corresponding to each of the resource elements determined according to Formula 10. In addition, if the terminal device sends the first signal through a plurality of uplink ports, for a manner of determining a signal sent through another uplink port other than the first uplink port, refer to the manner of determining a signal sent through the first uplink port.

Correspondingly, in S204, the network device receives, on each of the resource elements in the any second resource element set, the first signal sent by the terminal device through the first uplink port, where the first signal corresponding to each of the resource elements satisfies Formula 10. In addition, if the terminal device sends the first signal through the plurality of uplink ports, the network device may receive first signals respectively sent through the plurality of uplink ports. For a manner of determining a signal sent through another uplink port, refer to the manner of determining a signal sent through the first uplink port.

It should be understood that, on a resource element that does not belong to the second resource element set, transmit power of the first signal of the first uplink port is zero.

The foregoing $I_q$, $C_q$, $\Delta_q$, $\alpha_q$, $n_{SRS}^{cs,q}$, $u_q$, $v_q$, $n_{start,q}$, and $A_q^0, A_q^1, \ldots, A_q^{B-1}$ are configured for the first uplink port. Optionally, one or more parameters of $I_q$, $C_q$, $\Delta_q$, $\alpha_q$, $n_{SS}^{cs,q}$, $u_q$, $u_g$, $v_q$, $n_{start,q}$, and $A_q^0, A_q^1, \ldots, A_q^{B-1}$ corresponding to different first uplink ports may be different. In other words, when the first uplink port is a $p_i$ port of the plurality of uplink ports of the terminal device, one or more parameters of $I_q$, $C_q$, $\Delta_q$, $\alpha_q$, $n_{SRS}^{cs,q}$, $u_q$, $v_q$, $n_{start,q}$, and $A_q^0, A_q^1, \ldots, A_q^{B-1}$ may have a subscript i, representing parameters corresponding to the $p_i^{th}$ port.

Optionally, if one or more parameters of $I_q$, $C_q$, $\Delta_q$, $\alpha_q$, $n_{SRS}^{cs,q}$, $u_q$, $v_q$, $n_{start,q}$, and $A_q^0, A_q^1, \ldots, A_q^{B-1}$ are the same for all q=0, . . . , or N−1, a subscript q may be removed.

It should be noted that the scaling coefficient β may be determined by using one or more of an amplitude scaling parameter, a power control parameter, and a quantity of transmitted pilots, and the scaling coefficient β may be different for different uplink ports or may be different for different OFDM symbols.

In the example shown in FIG. 9, at least one of $I_q$, the parameter used for determining $I_q$, $\alpha_q$, or $n_{SRS}^{cs,q}$ may be sent by the network device to the terminal device. For example, the network device may send $I_q$ and/or the parameter used for determining $I_q$ to the terminal device, and/or the network device may send $\alpha_q$ or $n_{SRS}^{cs,q}$ to the terminal device.

The following describes communication apparatuses for implementing the foregoing methods in embodiments of this application with reference to the accompanying drawings. Therefore, all the foregoing content may be used in the following embodiments. Repeated content is not described again.

Figure 10:
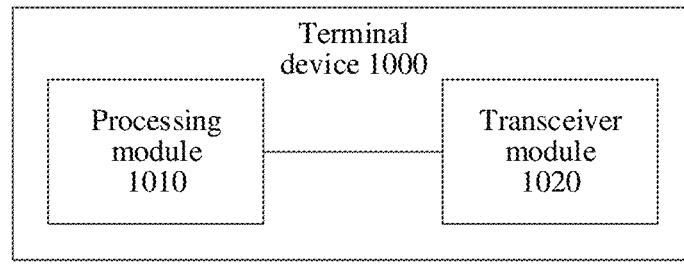
FIG. 10 is a schematic diagram of a structure of a communication apparatus according to an embodiment of this application.

FIG. 10 is a schematic block diagram of a communication apparatus according to an embodiment of this application. For example, the communication apparatus is a terminal device woo shown in FIG. 10.

The terminal device 1000 includes a processing module 1010 and a transceiver module 1020. For example, the terminal device 1000 may be a network device, or may be a chip used in the terminal device, or another combined device, component, or the like that has a function of the terminal device. When the terminal device 1000 is a terminal device, the transceiver module 1020 may be a transceiver, and the transceiver may include an antenna, a radio frequency circuit, and the like; and the processing module 1010 may be a processor, for example, a baseband processor, and the baseband processor may include one or more central processing units (central processing units, CPUs). When the terminal device 1000 is the component that has the function of the terminal device, the transceiver module 1020 may be a radio frequency unit, and the processing module 1010 may be a processor, for example, a baseband processor. When the terminal device 1000 is a chip system, the transceiver module 1020 may be an input/output interface of a chip (for example, a baseband chip), and the processing module 1010 may be a processor of the chip system, and may include one or more central processing units. It should be understood that, in this embodiment of this application, the processing module low may be implemented as a processor or a processor-related circuit component, and the transceiver module 1020 may be implemented as a transceiver or a transceiver-related circuit component.

For example, the processing module 1010 may be configured to perform all operations except the sending and receiving operations, for example, S101, S102, S201, and S202, performed by the terminal device in the embodiment shown in FIG. 5 or FIG. 8, and/or configured to support another process of the technology described in this specification, for example, generate a message, information, and/or signaling sent by the transceiver module 1020, and process a message, information, and/or signaling received by the transceiver module 1020. The transceiver module 1020 may be configured to receive and/or send a message, information, and/or signaling, for example, may be configured to receive frequency domain information. For example, for the first resource element set shown in FIG. 6, the transceiver module 1020 may be configured to receive I; for the first resource element set shown in FIG. 7, the transceiver module 1020 may be configured to receive $I_q$; and for the first resource element set shown in FIG. 9, the transceiver module 1020 may be configured to receive I.

In addition, the transceiver module 1020 may be one functional module. The functional module can implement both a sending operation and a receiving operation. For example, the transceiver module 1020 may be configured to perform all the sending operations and receiving operations performed by the terminal device in the embodiment shown in FIG. 5 or FIG. 8. For example, when a sending operation is performed, it may be considered that the transceiver module 1020 is a sending module. When a receiving operation is performed, it may be considered that the transceiver module 1020 is a receiving module. Alternatively, the transceiver module 1020 may include two functional modules. The transceiver module 1020 may be considered as a general term of the two functional modules, and the two functional modules are respectively a sending module and a receiving module. The sending module is configured to implement a sending operation. For example, the sending module may be configured to perform all the sending operations performed by the terminal device in the embodiment shown in FIG. 5 or FIG. 8. The receiving module is configured to implement a receiving operation. For example, the receiving module may be configured to perform all the receiving operations performed by the terminal device in the embodiment in FIG. 5 or FIG. 8.

Specifically, when performing the method shown in FIG. 5, the processing module 1010 may determine a second resource element set from a first resource element set, and determine, based on frequency domain positions of all resource elements in the second resource element set, a first sequence of a first uplink port on each of the resource elements. The transceiver module 1020 may be configured to send a first signal on each of the resource elements based on the first sequence.

For descriptions of the first resource element set, the second resource element set, and the first sequence, refer to the foregoing descriptions of the procedure shown in FIG. 5.

In a possible design, when the first signal is an SRS, and the first resource element set includes a resource element that is on a first OFDM symbol and that belongs to a transmit bandwidth of the first signal, the transceiver module 1020 may be further configured to receive I and/or a parameter used for determining I, and/or receive α and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the transceiver module 1020 may be further configured to receive $I_q$ and/or a parameter used for determining $I_q$, and/or receive α and/or $n_{SRS}^{cs}$.

When performing the method shown in FIG. 8, the processing module 1010 may determine a plurality of second resource element sets from a first resource element set, and determine, based on frequency domain positions of all resource elements in any second resource element set, a first sequence of a first uplink port on each of the resource elements in the any second resource element set. The transceiver module 1020 may be configured to send a first signal on each of the resource elements in the any second resource element set based on the first sequence.

For descriptions of the first resource element set, the second resource element set, and the first sequence, refer to the foregoing descriptions of the procedure shown in FIG. 8.

In a possible design, when the first signal is an SRS, the transceiver module 1020 may be further configured to receive $I_q$ and/or a parameter used for determining $I_q$, and/or receive $α_q$ and/or $n_{SRS}^{cs,q}$.

Figure 11:
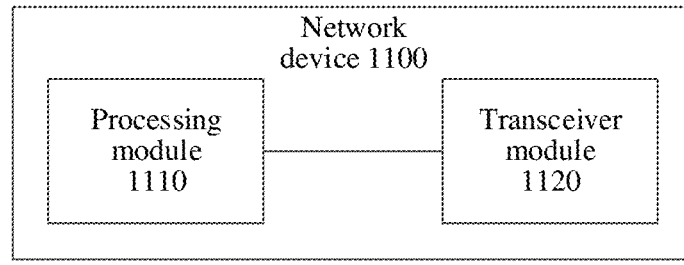
FIG. 11 is a schematic diagram of a structure of another communication apparatus according to an embodiment of this application.

FIG. 11 is a schematic block diagram of another communication apparatus according to an embodiment of this application. For example, the communication apparatus is a network device 1100.

The network device 1100 may include a processing module 1110 and a transceiver module 1120. For example, the network device 1100 may be a network device shown in the figure, or may be a chip used in the network device, or another combined device, component, or the like that has a function of the network device. When the network device 1100 is a network device, the transceiver module 1120 may be a transceiver, and the transceiver may include an antenna, a radio frequency circuit, and the like; and the processing module 1110 may be a processor, and the processor may include one or more CPUs. When the network device 1100 is the component that has the function of the network device, the transceiver module 1120 may be a radio frequency unit, and the processing module 1110 may be a processor, for example, a baseband processor. When the network device 1100 is a chip system, the transceiver module 1120 may be an input/output interface of a chip (for example, a baseband chip), and the processing module 1110 may be a processor of the chip system, and may include one or more central processing units. It should be understood that, in this embodiment of this application, the processing module 1110 may be implemented as a processor or a processor-related circuit component, and the transceiver module 1120 may be implemented as a transceiver or a transceiver-related circuit component.

For example, the processing module 1110 may be configured to perform all operations except the sending and receiving operations performed by the network device in the embodiment shown in FIG. 3 or FIG. 5, for example, perform S101, S102, S201, and S202; and for another example, generate a message, information, and/or signaling sent by the transceiver module 1120, and/or process a message, information, and/or signaling received by the transceiver module 1120, and/or support another process of the technology described in this specification. The transceiver module 1120 may be configured to perform all the receiving operations performed by the network device in the embodiment shown in FIG. 3 or FIG. 5, for example, perform receiving and/or sending of a message, information, and/or signaling, or may be configured to send frequency domain information. For example, for the first resource element set shown in FIG. 6, the transceiver module 1120 may be configured to send I; for the first resource element set shown in FIG. 7, the transceiver module 1120 may be configured to send $I_q$; and for the first resource element set shown in FIG. 9, the transceiver module 1120 may be configured to send I.

In addition, the transceiver module 1120 may be one functional module. The functional module can implement both a sending operation and a receiving operation. For example, the transceiver module 1120 may be configured to perform all the sending operations and receiving operations performed by the network device in the embodiment shown in FIG. 5 or FIG. 8. For example, when a sending operation is performed, it may be considered that the transceiver module 1120 is a sending module. When a receiving operation is performed, it may be considered that the transceiver module 1120 is a receiving module. Alternatively, the transceiver module 1120 may include two functional modules. The transceiver module 1120 may be considered as a general term of the two functional modules, and the two functional modules are respectively a sending module and a receiving module. The sending module is configured to implement a sending operation. For example, the sending module may be configured to perform all the sending operations performed by the network device in the embodiment shown in FIG. 5 or FIG. 8. The receiving module is configured to implement a receiving operation. For example, the receiving module may be configured to perform all the receiving operations performed by the network device in the embodiment shown in FIG. 5 or FIG. 8.

Specifically, when performing the method shown in FIG. 5, the processing module 1110 may determine a second resource element set from a first resource element set, and determine, based on frequency domain positions of all resource elements in the second resource element set, a first sequence of a first uplink port on each of the resource elements. The transceiver module 1120 may be configured to receive a first signal on each of the resource elements based on the first sequence.

For descriptions of the first resource element set, the second resource element set, and the first sequence, refer to the foregoing descriptions of the procedure shown in FIG. 5.

In a possible design, when the first signal is an SRS, and the first resource element set includes a resource element that is on a first OFDM symbol and that belongs to a transmit bandwidth of the first signal, the transceiver module 1120 may be further configured to send I and/or a parameter used for determining I, and/or send a and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the transceiver module 1120 may be further configured to send $I_q$ and/or a parameter used for determining $I_q$, and/or send $\alpha$ and/or $n_{SRS}^{cs}$.

When performing the method shown in FIG. 8, the processing module 1110 may determine a plurality of second resource element sets from a first resource element set, and determine, based on frequency domain positions of all resource elements in any second resource element set, a first sequence of a first uplink port on each of the resource elements in the any second resource element set. The transceiver module 1120 may be configured to receive a first signal on each of the resource elements in the any second resource element set based on the first sequence.

For descriptions of the first resource element set, the second resource element set, and the first sequence, refer to the foregoing descriptions of the procedure shown in FIG. 8.

In a possible design, when the first signal is an SRS, the transceiver module 1120 may be further configured to send $I_q$ and/or a parameter used for determining $I_q$, and/or send $\alpha_q$ and/or $n_{SRS}^{cs,q}$.

An embodiment of this application further provides a communication apparatus. The communication apparatus may be a terminal device, or may be a circuit. The communication apparatus may be configured to perform an action performed by the terminal device in the foregoing method embodiments.

Figure 12:
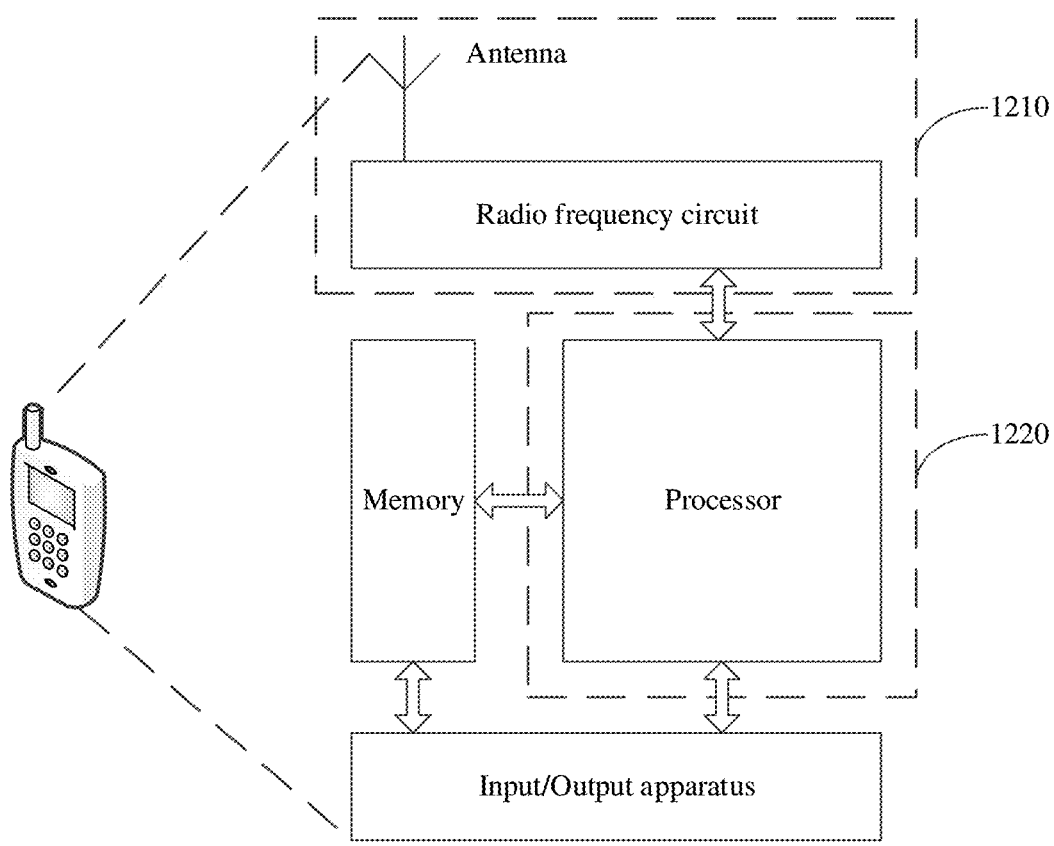
FIG. 12 is a schematic diagram of a structure of another communication apparatus according to an embodiment of this application.

When the communication apparatus is a terminal device, FIG. 12 is a simplified schematic diagram of a structure of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1210 is configured to perform the sending operations and the receiving operations of the terminal device in the foregoing method embodiments, and the processing unit 1220 is configured to perform an operation other than the receiving operations and the sending operations of the terminal device in the foregoing method embodiments.

For example, the processing unit 1220 may perform an action similar to that performed by the processing module 1010, or the processing module 1220 includes the processing module 1010. The transceiver unit 1210 may perform an action similar to that performed by the transceiver module 1020, or the transceiver unit 1210 includes the transceiver module 1020.

When performing the method shown in FIG. 5, the processing unit 1220 may determine a second resource element set from a first resource element set, and determine, based on frequency domain positions of all resource elements in the second resource element set, a first sequence of a first uplink port on each of the resource elements. The transceiver unit 1210 may be configured to send a first signal on each of the resource elements based on the first sequence.

For descriptions of the first resource element set, the second resource element set, and the first sequence, refer to the foregoing descriptions of the procedure shown in FIG. 5.

In a possible design, when the first signal is an SRS, and the first resource element set includes a resource element that is on a first OFDM symbol and that belongs to a transmit bandwidth of the first signal, the transceiver unit 1210 may be further configured to receive I and/or a parameter used for determining I, and/or receive $\alpha$ and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the transceiver unit 1210 may be further configured to receive $I_q$ and/or a parameter used for determining $I_q$, and/or receive $\alpha$ and/or $n_{SRS}^{cs}$.

When performing the method shown in FIG. 8, the processing unit 1220 may determine a plurality of second resource element sets from a first resource element set, and determine, based on frequency domain positions of all resource elements in any second resource element set, a first sequence of a first uplink port on each of the resource elements in the any second resource element set. The transceiver unit 1210 may be configured to send a first signal on each of the resource elements in the any second resource element set based on the first sequence.

For descriptions of the first resource element set, the second resource element set, and the first sequence, refer to the foregoing descriptions of the procedure shown in FIG. 8.

In a possible design, when the first signal is an SRS, the transceiver unit 1210 may be further configured to receive $I_q$ and/or a parameter used for determining $I_q$, and/or receive $\alpha_q$ and/or $n_{SRS}^{cs,q}$.

When the communication apparatus is a chip apparatus or a circuit, or the communication apparatus has a structure other than that shown in FIG. 12, the apparatus may include a transceiver unit and a processing unit. The transceiver unit may be an input/output circuit and/or a communication interface. The processing unit is an integrated processor, a microprocessor, or an integrated circuit. The transceiver unit and the processing unit may respectively perform actions of the transceiver unit 1210 and the processing unit 1220.

Figure 13:
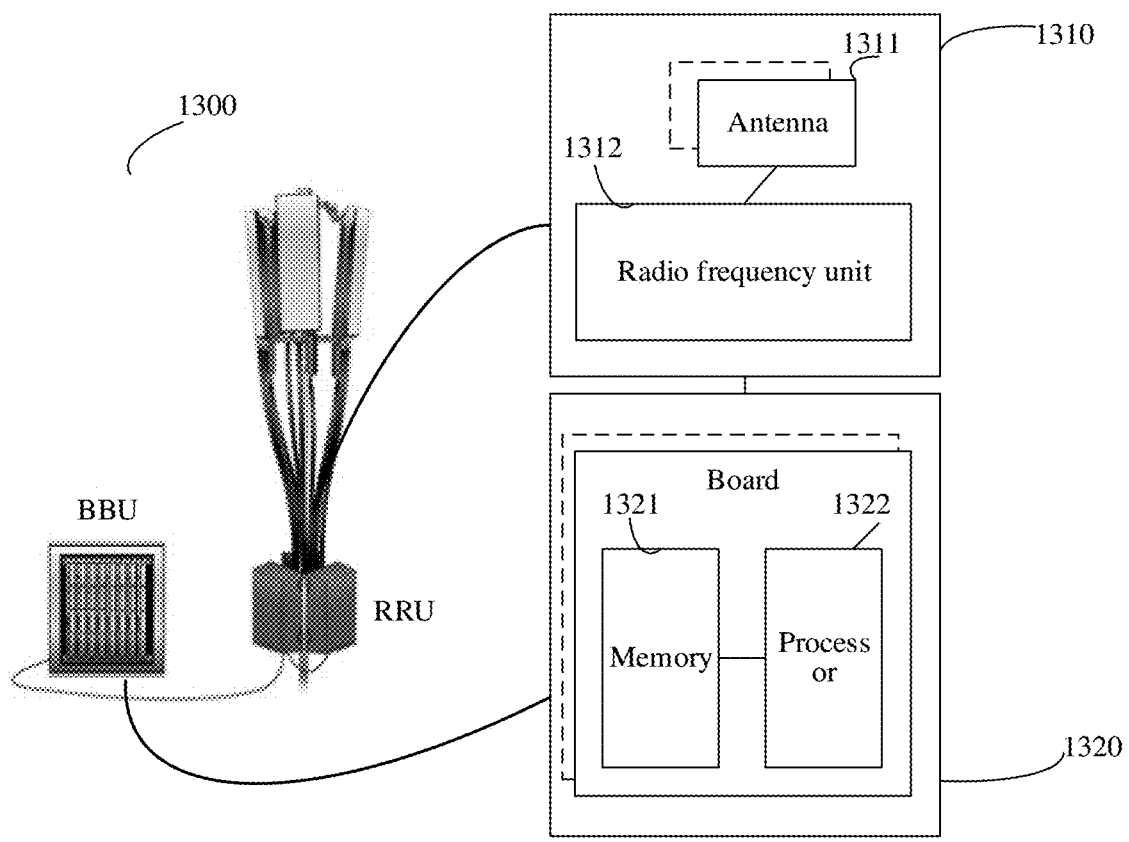
FIG. 13 is a schematic diagram of a structure of another communication apparatus according to an embodiment of this application.

When the apparatus in this embodiment of this application is a network device, the apparatus may be shown in FIG. 13. The apparatus 1300 includes one or more radio frequency units such as a remote radio unit (remote radio unit, RRU) 1310 and one or more baseband units (baseband units, BBUs) (which may also be referred to as a digital unit, digital unit, DU) 1320. The RRU 1310 may be referred to as a transceiver module. The transceiver module may include a sending module and a receiving module, or the transceiver module may be one module that can implement sending and receiving functions. The transceiver module may correspond to the transceiver module 1120 in FIG. 11, in other words, the transceiver module may perform an action performed by the transceiver module 1120. Optionally, the transceiver module may also be referred to as a transceiver machine, a transceiver circuit, a transceiver, or the like, and may include at least one antenna 1311 and a radio frequency unit 1312. The RRU 1310 is mainly configured to: receive and send a radio frequency signal, and perform conversion between the radio frequency signal and a baseband signal. The BBU 1310 is mainly configured to perform baseband processing, control a base station, and the like. The RRU 1310 and the BBU 1320 may be physically disposed together, or may be physically separated, that is, in a distributed base station.

The BBU 1320 is a control center of the base station, may also be referred to as a processing module, may correspond to the processing module 1110 in FIG. 1i, and is mainly configured to complete a baseband processing function, such as channel coding, multiplexing, modulation, and spectrum spreading. In addition, the processing module may perform an action performed by the processing module 1110. For example, the BBU (processing module) may be configured to control the base station to perform an operation procedure related to the network device in the foregoing method embodiments.

In an example, the BBU 1320 may include one or more boards, and a plurality of boards may jointly support a radio access network (for example, an LTE network) of a single access standard, or may separately support radio access networks (for example, an LTE network, a 5G network, or another network) of different access standards. The BBU 1320 further includes a memory 1321 and a processor 1322. The memory 1321 is configured to store necessary instructions and data. The processor 1322 is configured to control the base station to perform a necessary action, for example, configured to control the base station to perform an operation procedure related to the network device in the foregoing method embodiments. The memory 1321 and the processor 1322 may serve the one or more boards. To be specific, a memory and a processor may be disposed on each board. Alternatively, a plurality of boards may share a same memory and a same processor. In addition, a necessary circuit may further be disposed on each board.

When performing the method shown in FIG. 5, the BBU 1320 may determine a second resource element set from a first resource element set, and determine, based on frequency domain positions of all resource elements in the second resource element set, a first sequence of a first uplink port on each of the resource elements. The RRU 1310 may be configured to receive a first signal on each of the resource elements based on the first sequence.

For descriptions of the first resource element set, the second resource element set, and the first sequence, refer to the foregoing descriptions of the procedure shown in FIG. 5.

In a possible design, when the first signal is an SRS, and the first resource element set includes a resource element that is on a first OFDM symbol and that belongs to a transmit bandwidth of the first signal, the RRU 1310 may be further configured to send I and/or a parameter used for determining I, and/or send $\alpha$ and/or $n_{SRS}^{cs}$.

In a possible design, when the first signal is an SRS, and the first resource element set includes a resource element that is on all OFDM symbols in a first OFDM symbol group and that belongs to a transmit bandwidth of the first signal, the RRU 1310 may be further configured to send $I_q$ and/or a parameter used for determining $I_q$, and/or send $\alpha$ and/or $n_{SRS}^{cs}$.

When performing the method shown in FIG. 8, the BBU 1320 may determine a plurality of second resource element sets from a first resource element set, and determine, based on frequency domain positions of all resource elements in any second resource element set, a first sequence of a first uplink port on each of the resource elements in the any second resource element set. The RRU 1310 may be configured to receive a first signal on each of the resource elements in the any second resource element set based on the first sequence.

For descriptions of the first resource element set, the second resource element set, and the first sequence, refer to the foregoing descriptions of the procedure shown in FIG. 8.

In a possible design, when the first signal is an SRS, the RRU 1310 may be further configured to send $I_q$ and/or a parameter used for determining $I_q$, and/or send $\alpha_q$ and/or $n_{SRS}^{cs,q}$.

When the communication apparatus is a chip apparatus or a circuit, or the communication apparatus has a structure other than that shown in FIG. 13, the apparatus may include a transceiver unit and a processing unit. The transceiver unit may be an input/output circuit and/or a communication interface. The processing unit is an integrated processor, a microprocessor, or an integrated circuit. The transceiver unit and the processing unit may respectively perform actions of the RRU 1310 and the BBU 1320.

In an embodiment, the sending apparatus (for example, a terminal device) and the receiving apparatus (for example, a network device) in the present invention may store sequences (or sequence sets or sequence groups) in the foregoing embodiments. This storage manner may be implemented by using a memory, a storage medium, or another device, for example, a chip or a processor, having a storage function. Specific content of storage is not limited herein. In a further implementation, a method for generating a formula may be stored. For example, a formula and a program are stored, or a fixed circuit that generates a sequence is stored, and then various sequence-related parameters are obtained, to generate a corresponding sequence. For example, a first sequence may be stored, or a parameter used for determining the first sequence is stored, and then the first sequence is determined according to a formula or based on the parameter.

An embodiment of this application provides a communication system. The communication system may include the terminal device in the system shown in FIG. 1 or FIG. 2, and include the terminal device or the network device in the system shown in FIG. 1 or FIG. 2. Optionally, the terminal device and the network device in the communication system may perform the communication method shown in any one of FIG. 3 to FIG. 5.

An embodiment of this application further provides a computer-readable storage medium. The computer-readable storage medium stores a computer program. When the computer program is executed by a computer, the computer may implement a procedure related to the terminal device or the network device in the embodiment shown in FIG. 5 or FIG. 8 provided in the foregoing method embodiments.

An embodiment of this application further provides a computer program product. The compute program product is configured to store a computer program. When the computer program is executed by a computer, the computer may implement a procedure related to the terminal device or the network device in the embodiment shown in FIG. 5 or FIG. 8 provided in the foregoing method embodiments.

An embodiment of this application further provides a chip or a chip system. The chip may include a processor. The processor may be configured to invoke a program or instructions in a memory, to perform a procedure related to the terminal device or the network device in the embodiment shown in FIG. 5 or FIG. 8 provided in the foregoing method embodiments. The chip system may include the chip, and may further include another component such as a memory or a transceiver.

An embodiment of this application further provides a circuit. The circuit may be coupled to a memory, and may be configured to perform a procedure related to the network device in the embodiment shown in FIG. 5 or FIG. 8 provided in the foregoing method embodiments. The chip system may include the chip, and may further include another component such as a memory or a transceiver.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with units and algorithm steps of the examples described in embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method shown in embodiments of this application. The foregoing computer-readable storage medium may be any usable medium that can be accessed by a computer. By way of example but not limitation, the computer-readable medium may include a random access memory (random access memory, RAM), a read-only memory (ROM), an electrically erasable programmable read only memory (EEPROM), a compact disc read-only memory (CD-ROM), a universal serial bus flash disk, a removable hard disk or another compact disc storage, a magnetic disk storage medium or another magnetic storage device, or any other medium that can be used for carrying or storing expected program code in a form of instructions or a data structure and that can be accessed by a computer.

The descriptions shown above are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A communication method, comprising:
   determining a second resource element set from a first resource element set, wherein frequency domain positions of all resource elements in the second resource element set are distributed at unequal intervals, and the first resource element set comprises a resource element that belongs to a transmit bandwidth of a first signal, wherein the resource element is on:
   a first orthogonal frequency division multiplexing (OFDM) symbol; or
   all OFDM symbols in a first OFDM symbol group, and wherein the first OFDM symbol group comprises a plurality of OFDM symbols;
   determining a first sequence of a first uplink port on each of the resource elements in the second resource element set based on the frequency domain positions of all the resource elements in the second resource element set; and
   sending the first signal on each of the resource elements in the second resource element set based on the first sequence.

2. The method according to claim 1, wherein the first resource element set comprises the resource element that is on the first OFDM symbol and that belongs to the transmit bandwidth, and wherein a first sequence $r^{(p)}(k)$ of the first uplink port on a $k^{th}$ resource element in the second resource element set satisfies:

$$r^{(p)}(k) = r^{(\alpha, l)}(k),$$

$$r^{(\alpha, l)}(k) = e^{wj\alpha \frac{l_k + \Delta}{c}} \bar{r}(k),$$

$\bar{r}(k)$ is a base sequence, I is a set of the frequency domain positions of all the resource elements in the second resource element set, $I_k$ indicates a frequency domain position of the $k^{th}$ resource element in the second resource element set, $k=0, \ldots,$ or $M-1$, $w=1$ or $w=-1$, $\Delta$ is a constant, C is an integer greater than or equal to 1, p is the first uplink port, and $\alpha$ is a cyclic shift value.

3. The method according to claim 2, wherein the first signal is an uplink SRS (sounding reference signal), and wherein $\alpha$ satisfies:

$$\alpha = 2\pi \frac{n_{SRS}^{cs}}{n_{SRS}^{cs,max}}, \text{ and } n_{SRS}^{cs} \in \{0, 1, \ldots, n_{SRS}^{cs,max} - 1\}.$$

4. The method according to claim 3, further comprising: receiving I or a parameter for determining I; or receiving $\alpha$ or $n_{SRS}^{cs}$.

5. The method according to claim 2, wherein a first signal $a_{I_k + n_{start}}^{(p)}$ corresponding to a resource element whose number is $I_k + n_{start}$ in the second resource element set satisfies:

$a_{I_k + n_{start}}^{(p)} = \beta \times r^{(p)}(k),$ and $k=0, \ldots,$ or $M-1$, where $\beta$ is a scaling coefficient, and $n_{start}$ is a frequency domain start position of the transmit bandwidth.

6. The method according to claim 1, wherein the first resource element set comprises the resource element that is on all the OFDM symbols in the first OFDM symbol group and that belongs to the transmit bandwidth, wherein the first OFDM symbol group comprises N OFDM symbols, wherein N is a positive integer greater than 1, and wherein a first sequence $r^{(p)}(k, q)$ of the first uplink port on a $k^{th}$ resource element on a $q^{th}$ OFDM symbol in the first OFDM symbol group satisfies:

$r^{(p)}(k,q) = r^{(\alpha, I_q)}(k),$ where $$r^{(\alpha, I_q)}(k) = e^{wj\alpha \frac{I_{q,k} + \Delta}{c}} \bar{r}(k + k_{start,q}),$$

$q \in \{0, 1, \ldots, N-1\},$ $\bar{r}(k)$ is a base sequence, $I_q$ is a set of frequency domain positions of resource elements corresponding to the $q^{th}$ OFDM symbol, the resource element corresponding to the $q^{th}$ OFDM symbol belongs to the second resource element set, $I_{q,k}$ indicates a frequency domain position of a $k^{th}$ resource element in a resource element set corresponding to the $q^{th}$ OFDM symbol, $k=0, \ldots,$ or $M_q - 1$, $w=1$ or $w=-1$, $k_{start,q}$ is a start position of a sequence of the first uplink port on a $q^{th}$ symbol, the start position of the sequence is a non-negative integer, $\Delta$ is a constant, C is an integer greater than or equal to 1, p is the first uplink port, and $\alpha$ is a cyclic shift value.

7. The method according to claim 6, wherein the first signal is an uplink SRS (sounding reference signal), and α satisfies:

$$r^{(\alpha,I_q)}(k) = e^{wj\alpha \frac{I_{q,k}+\Delta}{C}} \bar{r}(k+k_{start,q}), q \in \{0, 1, \ldots, N-1\},$$

8. The method according to claim 7, further comprising:
receiving $I_q$ or a parameter for determining $I_q$; or
receiving α or $n_{SRS}^{cs}$.

9. The method according to claim 6, wherein
the first sequence is divided into R segments, wherein a $u^{th}$ segment of the first sequence is carried on a resource element on the $q^{th}$ OFDM symbol, and wherein a length of a $t^{th}$ segment is $S_t$, t=0, ..., or R−1, $k_{start,q} = \Sigma_{t=0}^{u-1} S_t$, and $M_q = S_u$.

10. The method according to claim 6, wherein a first signal $a_{I_{q,k}+n_{start},L_q}^{(p)}$ corresponding to a resource element whose number is $I_{q,k}+n_{start}$ on the $q^{th}$ OFDM symbol satisfies:

$a_{I_{q,k}+n_{start},L_q}^{(p)} = \beta \times r^{(p)}(k,q), k=0, \ldots,$ or $M_q-1$, and
q=0,1, ..., or N−1, where β is a scaling coefficient, $n_{start}$ is a frequency domain start position of the transmit bandwidth, and $L_q$ indicates a number of the $q^{th}$ OFDM symbol.

11. A communication method, comprising:
determining a second resource element set from a first resource element set, wherein frequency domain positions of all resource elements in the second resource element set are distributed at unequal intervals, and the first resource element set comprises a resource element that belongs to a transmit bandwidth of a first signal, wherein the resource element is on:
a first orthogonal frequency division multiplexing (OFDM) symbol; or
all OFDM symbols in a first OFDM symbol group, and wherein the first OFDM symbol group comprises a plurality of OFDM symbols;
determining a first sequence of a first uplink port on each of the resource elements in the second resource element set based on the frequency domain positions of all the resource elements in the second resource element set; and
receiving the first signal on each of the resource elements in the second resource element set based on the first sequence.

12. The method according to claim 11, wherein the first resource element set comprises the resource element that is on the first OFDM symbol and that belongs to the transmit bandwidth, and wherein a first sequence $r^{(p)}(k)$ of the first uplink port on a $k^{th}$ resource element in the second resource element set satisfies:

$r^{(p)}(k) = r^{(\alpha,I)}(k)$, where $$r^{(\alpha,I)}(k) = e^{wj\alpha \frac{I_k+\Delta}{c}} \bar{r}(k),$$

$\bar{r}(k)$ is a base sequence, I is a set of the frequency domain positions of all the resource elements in the second resource element set, $I_k$ indicates a frequency domain position of the $k^{th}$ resource element in the second resource element set, k=0, ..., or M−1, w=1 or w=−1, Δ is a constant, C is an integer greater than or equal to 1, p is the first uplink port, and α is a cyclic shift value.

13. The method according to claim 12, wherein the first signal is an uplink SRS (sounding reference signal), and α satisfies:

$$\alpha = 2\pi \frac{n_{SRS}^{cs}}{n_{SRS}^{cs,max}}, \text{ and } n_{SRS}^{cs} \in \{0, 1, \ldots, n_{SRS}^{cs,max}-1\}.$$

14. The method according to claim 13, further comprising:
sending I or a parameter for determining I; or
sending α or $n_{SRS}^{cs}$.

15. A communication method, comprising:
determining a plurality of second resource element sets from a first resource element set, wherein frequency domain positions of all resource elements in each of the plurality of second resource element sets are distributed at unequal intervals, the first resource element set comprises a resource element that is on a plurality of second orthogonal frequency division multiplexing (OFDM) symbols and that belongs to a transmit bandwidth of a first signal, and each of the plurality of second OFDM symbols corresponds to one of the plurality of second resource element sets;
determining, based on frequency domain positions of all resource elements in a second resource element set of the plurality of second resource element sets, a first sequence of a first uplink port on each of the resource elements in the second resource element set; and
sending the first signal on each of the resource elements in the second resource element set based on the first sequence.

16. The method according to claim 15, wherein:
each second OFDM symbol corresponds to one frequency hopping bandwidth, the frequency hopping bandwidth is within the transmit bandwidth, two frequency hopping bandwidths corresponding to any two second OFDM symbols do not overlap in frequency domain, and each second resource element set of the plurality of second resource element sets corresponding to a respective second OFDM symbol of the plurality of second OFDM symbols belongs to a frequency hopping bandwidth corresponding to the respective second OFDM symbol.

17. The method according to claim 15, wherein a quantity of the plurality of second OFDM symbols is N, N is a positive integer greater than 1, and a first sequence $r^{(p)}(k, q)$ of the first uplink port on a $k^{th}$ resource element on a $q^{th}$ second OFDM symbol satisfies:

$r^{(p)}(k,q) = r_q^{(\alpha_q,I_q)}(k)$, where $$r^{(\alpha,I_q)}(k) = e^{wj\alpha \frac{I_{q,k}+\Delta}{c}} \bar{r}(k+k_{start,q}),$$

$q \in \{0, 1, \ldots, N-1\},$ $\bar{r}_q(k)$ is a base sequence, $I_q$ is a set of frequency domain positions of all resource elements in a $q^{th}$ second resource element set of the plurality of second resource element sets corresponding to the $q^{th}$ second OFDM symbol, $I_{q,k}$ indicates a frequency domain position of a $k^{th}$ resource element in the second resource element set corresponding to the $q^{th}$ second OFDM symbol, k=0, ..., or $M_q-1$, w=1 or w=−1, $\Delta_q$ is a constant, $C_q$ is an integer greater than or equal to 1, p is the first uplink port, and $\alpha_q$ is a cyclic shift value corresponding to the $q^{th}$ second OFDM symbol.

18. The method according to claim 17, wherein the first signal is an uplink SRS (sounding reference signal), and $\alpha_q$ satisfies:

$$\alpha = 2\pi \frac{n_{SRS}^{cs}}{n_{SRS}^{cs,max}}, \text{ and } n_{SRS}^{cs} \in \{0, 1, \ldots, n_{SRS}^{cs,max} - 1\}.$$

19. The method according to claim 17, further comprising:
receiving $I_q$ or a parameter for determining $I_q$; or
receiving $\alpha_q$ or $n_{SRS}^{cs,q}$.

20. The method according to claim 17, wherein a first signal $a_{I_{q,k}+n_{start,q},L_q}^{(p)}$ corresponding to a resource element whose number is $I_{q,k}+n_{start,q}$ on the $q^{th}$ second OFDM symbol satisfies:

$$a_{I_{q,k}+n_{start,q},L_q}^{(p)} = \beta \times r^{(p)}(k,q), k=0, \ldots, \text{ or } M_q-1, \text{ and } q=0,1,\ldots, \text{ or } N-1, \text{ where}$$

$\beta$ is a scaling coefficient, $n_{start,q}$ is a frequency domain start position of a frequency hopping bandwidth corresponding to the $q^{th}$ second OFDM symbol, and $L_q$ indicates a number of the $q^{th}$ second OFDM symbol.

* * * * *

UNITED STATES PATENT AND TRADEMARK OFFICE
CERTIFICATE OF CORRECTION

PATENT NO. : 12,206,541 B2
APPLICATION NO. : 18/324631
DATED : January 21, 2025
INVENTOR(S) : Cai et al.

It is certified that error appears in the above-identified patent and that said Letters Patent is hereby corrected as shown below:

In the Claims

In Column 44, in Claim 2, Line 5, delete "$r^{(p)}(k)=r^{(a,l)}(k),$" and insert -- $r^{(p)}(k) = r^{(a,l)}(k)$, where --.

In Column 44, in Claim 2, Line 16, delete "Cis" and insert -- C is --.

In Column 44, in Claim 3, Lines 24-25, delete "$\alpha = 2\pi \frac{n_{SRS}^{cs}}{n_{SRS}^{cs,max}}$, and $n_{SRS}^{cs} \in \{0, 1, \ldots, n_{SRS}^{cs,max} - 1\}.$"

and insert -- $\alpha = 2\pi \frac{n_{SRS}^{\text{cyclic shift (cs)}}}{n_{SRS}^{cs,max}}$, and $n_{SRS}^{cs} \in \{0,1,\ldots, n_{SRS}^{cs,max} - 1\}.$ --.

In Column 44, in Claim 5, Line 32, delete "$a_{I_k+n_{start}}^{(p)}$" and insert -- $a_{I_k+n_{start}}^{(p)}$ --.

In Column 44, in Claim 5, Line 35, delete "$a_{I_k+n_{start}}^{(p)}$" and insert -- $a_{I_k+n_{start}}^{(p)}$ --.

In Column 44, in Claim 6, Line 65, delete "Cis" and insert -- C is --.

In Column 45, in Claim 7, Lines 6-7, delete

"$r^{(\alpha,J_q)}(k) = e^{wj\alpha \frac{I_{q,k}+\Delta}{C}} \bar{r}(k + k_{start,q}), q \in \{0, 1, \ldots, N - 1\},$" and insert -- $\alpha = 2\pi \frac{n_{SRS}^{\text{cyclic shift (cs)}}}{n_{SRS}^{cs,max}}$, and $n_{SRS}^{cs} \in \{0,1,\ldots, n_{SRS}^{cs,max} - 1\}.$ --.

In Column 45, in Claim 10, Line 19, delete "$a_{I_{q,k}+n_{start},L_q}^{(p)}$" and -- $a_{I_{q,k}+n_{start},L_q}^{(p)}$ --.

Signed and Sealed this
First Day of April, 2025

Coke Morgan Stewart
*Acting Director of the United States Patent and Trademark Office*

CERTIFICATE OF CORRECTION (continued)
U.S. Pat. No. 12,206,541 B2

In Column 45, in Claim 10, Line 22, delete "$a^{(p)}_{I_{q,k}+n_{start},L_q}$" and insert -- $\alpha^{(p)}_{I_{q,k}+n_{start},L_q}$ --.

In Column 45, in Claim 10, Line 52, delete "r$^{(p)}$ (k)" and insert -- r$^{(p)}$(k) --.

In Column 45, in Claim 12, Line 65, delete "Cis" and insert -- C is --.

In Column 46, in Claim 13, Lines 6-7, delete "$\alpha = 2\pi \frac{n^{cs}_{SRS}}{n^{cs,max}_{SRS}}$, and $n^{cs}_{SRS} \in \{0, 1, \ldots, n^{cs,max}_{SRS} - 1\}.$" and insert -- $\alpha = 2\pi \frac{n^{\text{cyclic shift (cs)}}_{SRS}}{n^{cs,max}_{SRS}}$, and $n^{cs}_{SRS} \in \{0, 1, \ldots, n^{cs,max}_{SRS} - 1\}.$ --.

In Column 46, in Claim 17, Line 52, delete "$r^{(p)}(k,q) = r^{(\alpha_q, I_q)}_q(k),$" and insert -- $r^{(p)}(k,q) = r^{(\alpha_q, I_q)}_q(k),$ --.

In Column 46, in Claim 17, Lines 55-56, delete "$r^{(\alpha, I_q)}(k) = e^{wj\alpha \frac{I_{q,k}+\Delta}{c}} \bar{r}(k + k_{start,q}),$" and insert -- $r^{(\alpha_q, I_q)}_q(k) = e^{wj\alpha_q \frac{I_{q,k}+\Delta_q}{c_q}} \tilde{r}_q(k),$ --.

In Column 46, in Claim 17, Line 66, delete "orw=−1," and insert -- or w =−1, --.

In Column 47, in Claim 18, Lines 7-8, delete "$\alpha = 2\pi \frac{n^{cs}_{SRS}}{n^{cs,max}_{SRS}}$, and $n^{cs}_{SRS} \in \{0, 1, \ldots, n^{cs,max}_{SRS} - 1\}.$" and insert -- $\alpha = 2\pi \frac{n^{\text{cyclic shift (cs)}}_{SRS}}{n^{cs,max}_{SRS}}$, and $n^{cs}_{SRS} \in \{0, 1, \ldots, n^{cs,max}_{SRS} - 1\}.$ --.

In Column 47, in Claim 20, Line 16, delete "$a^{(p)}_{I_{q,k}+n_{start,q},L^q}$" and insert -- $\alpha^{(p)}_{I_{q,k}+n_{start,q},L_q}$ --.

In Column 47, in Claim 20, Line 20, delete "$a^{(p)}_{I_{q,k}+n_{start,q},L^q}$" and insert -- $\alpha^{(p)}_{I_{q,k}+n_{start,q},L_q}$ --.